United States Patent
Shimizu

(10) Patent No.: US 9,244,870 B2
(45) Date of Patent: Jan. 26, 2016

(54) SEMICONDUCTOR MEMORY SYSTEM WITH CURRENT CONSUMPTION CONTROL

(75) Inventor: Takahiro Shimizu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 880 days.

(21) Appl. No.: 13/426,977

(22) Filed: Mar. 22, 2012

(65) Prior Publication Data

US 2012/0265949 A1    Oct. 18, 2012

(30) Foreign Application Priority Data

Apr. 12, 2011    (JP) ................................ 2011-088340

(51) Int. Cl.
*G06F 13/16*    (2006.01)

(52) U.S. Cl.
CPC .................. *G06F 13/1689* (2013.01)

(58) Field of Classification Search
CPC .............................. G06F 13/1689; G11C 5/14
USPC ............. 365/185.22, 226–227; 711/E12.001, 711/154
See application file for complete search history.

(56) References Cited

U.S. PATENT DOCUMENTS

| | | | | |
|---|---|---|---|---|
| 6,857,055 B2 * | 2/2005 | Jeddeloh | ........................ | 711/163 |
| 8,908,463 B1 * | 12/2014 | Fukuda | ........................ | 365/227 |
| 2008/0192548 A1 * | 8/2008 | Shibata et al. | ............ | 365/185.17 |
| 2010/0034042 A1 * | 2/2010 | Ben-Rubi | ..................... | 365/226 |
| 2010/0036998 A1 * | 2/2010 | Ben-Rubi | ..................... | 711/100 |
| 2010/0191900 A1 * | 7/2010 | Park | .............................. | 711/103 |
| 2011/0022781 A1 * | 1/2011 | Wakrat et al. | ................ | 711/103 |
| 2011/0173462 A1 * | 7/2011 | Wakrat et al. | ................ | 713/300 |
| 2011/0271040 A1 * | 11/2011 | Kamizono | ..................... | 711/103 |
| 2012/0063234 A1 * | 3/2012 | Shiga et al. | ............. | 365/185.22 |
| 2012/0163112 A1 * | 6/2012 | Shibata | ......................... | 365/226 |
| 2013/0301372 A1 * | 11/2013 | Park et al. | ..................... | 365/227 |

FOREIGN PATENT DOCUMENTS

| | | |
|---|---|---|
| JP | 2-287845 | 11/1990 |
| JP | 10-228415 | 8/1998 |
| JP | 2008-197807 | 8/2008 |

OTHER PUBLICATIONS

Japanese Office Action issued Mar. 18, 2014, in Japan Patent Application No. 2011-088340 (with English translation).
Office Action issued on Jul. 1, 2014 in the corresponding Japanese Patent Application No. 2011-088340 (with English Translation).

* cited by examiner

*Primary Examiner* — Vanthu Nguyen
*Assistant Examiner* — Khamdan Alrobaie
(74) *Attorney, Agent, or Firm* — Oblon, McClelland, Maier & Neustadt, L.L.P.

(57) ABSTRACT

According to one embodiment, a semiconductor memory system includes semiconductor memories, and a memory controller configured to control the semiconductor memories. Each of the semiconductor memories is configured to execute an internal sequence including operations and have a wait period after an end of each of the operations, to notify, during the wait period, a status signal, which notifies in advance a start of a next operation, to the memory controller, and to start the next operation upon receiving a restart instruction of the internal sequence from the memory controller.

15 Claims, 18 Drawing Sheets

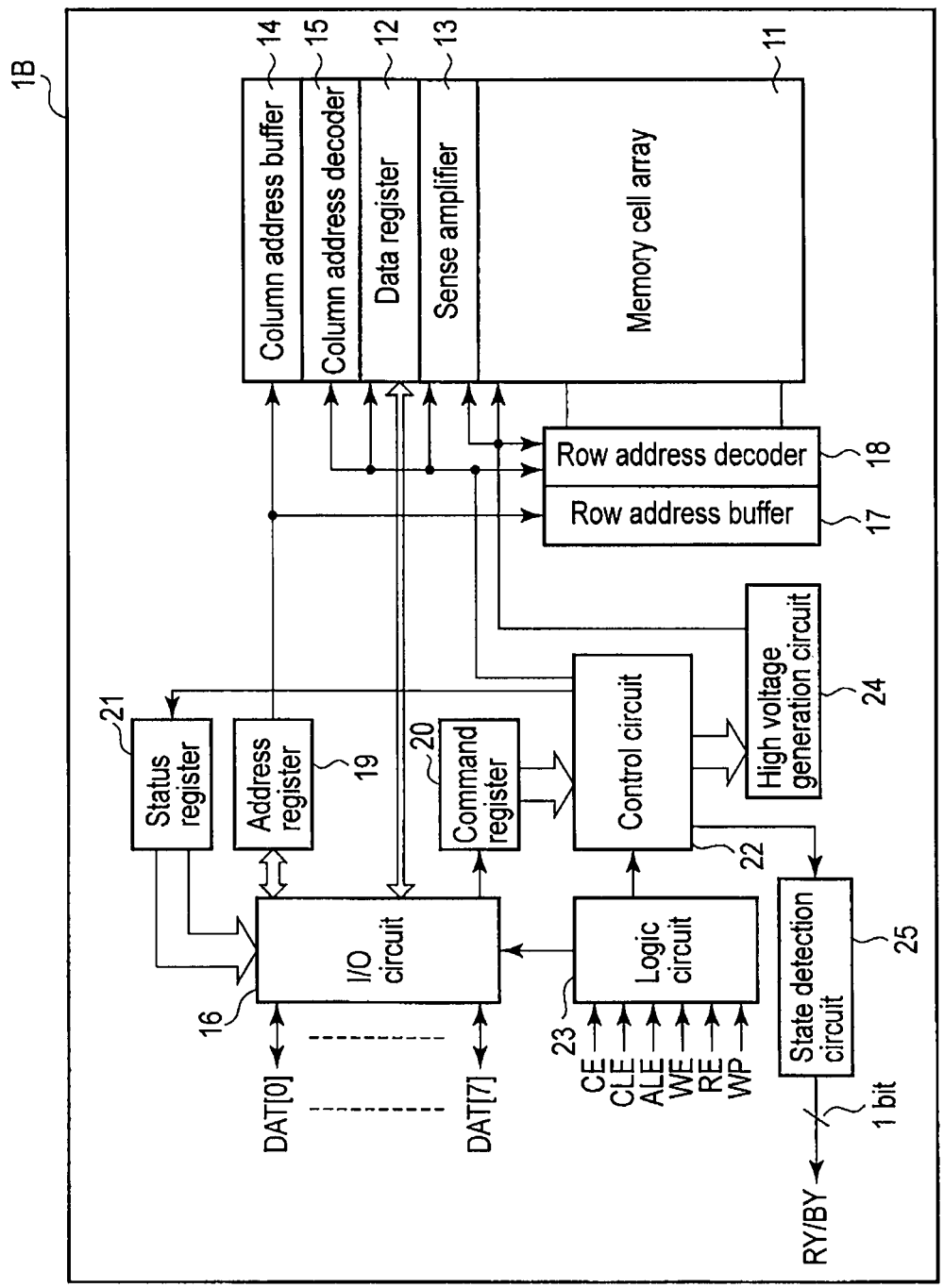
F I G. 1

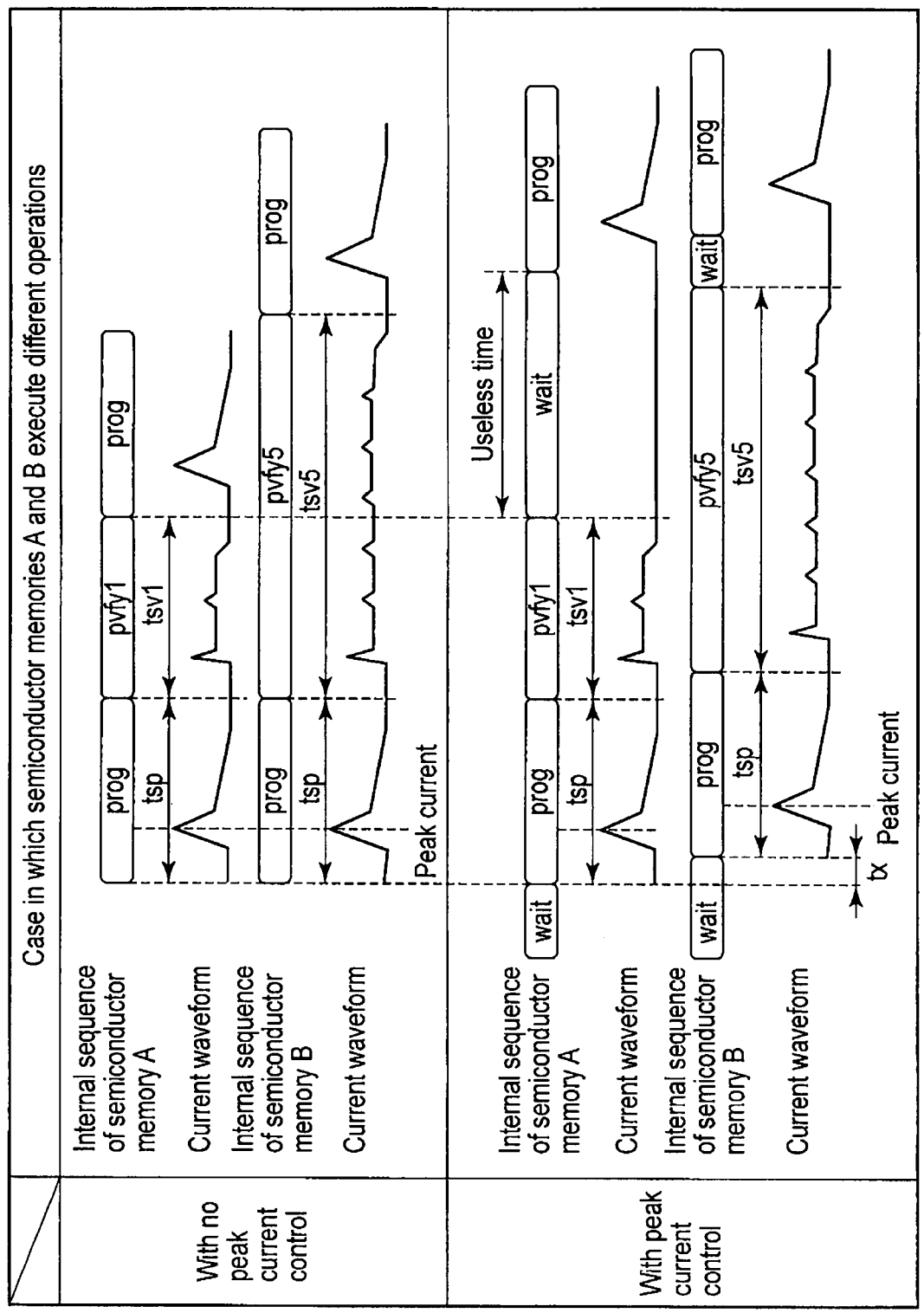
F I G. 5

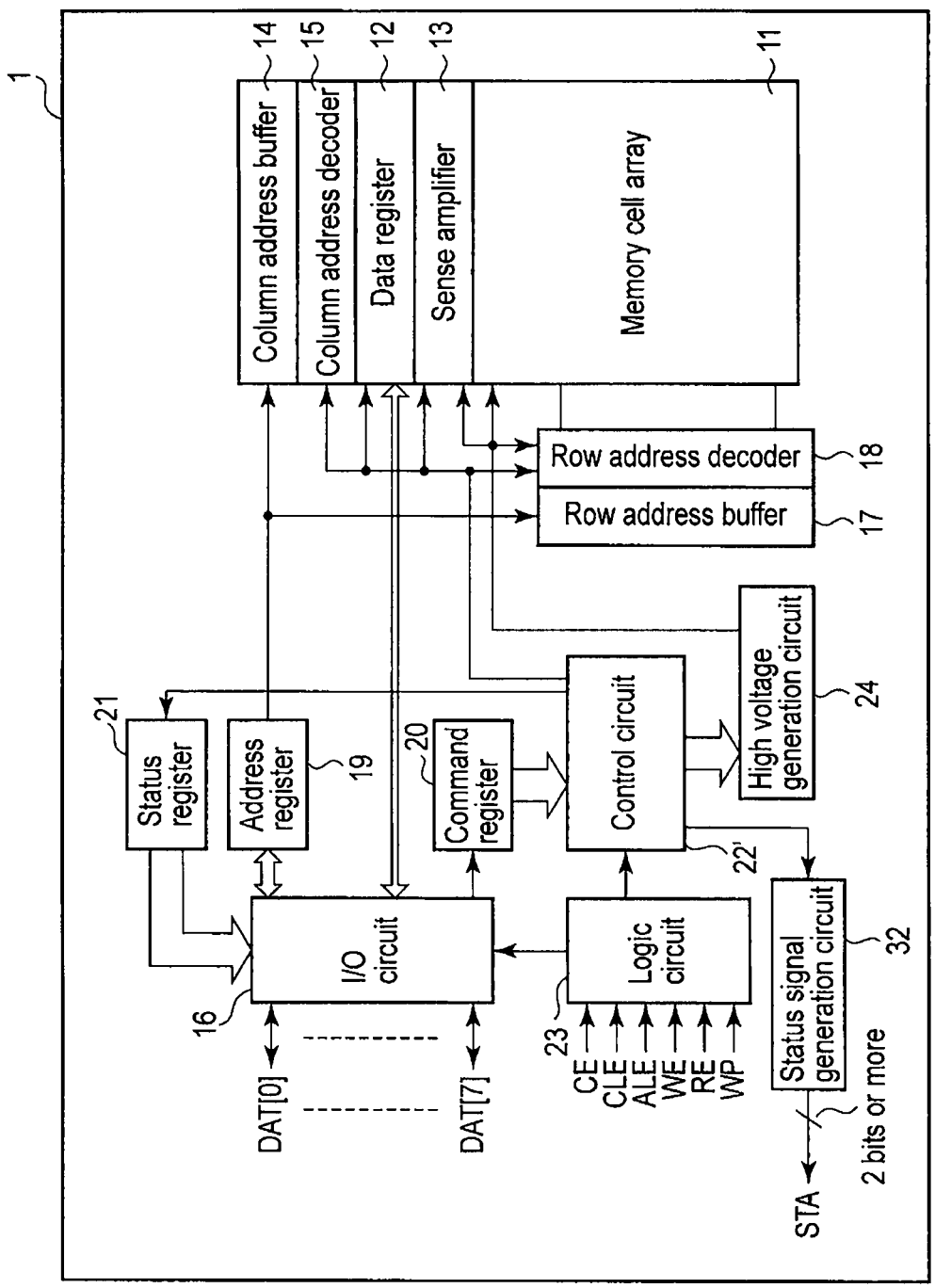
F I G. 6

| Status signal | Next operation |
|---|---|
| 0000 | (not wait) |
| 0001 | prog |
| 0010 | pvfy1 |
| 0011 | pvfy2 |
| 0100 | pvfy3 |
| 0101 | pvfy4 |
| 0110 | pvfy5 |
| 0111 | read1 |
| 1000 | read2 |
| 1001 | read3 |
| 1010 | erase |
| 1011 | evfy |
| 1100 | (reserve) |
| 1101 | (reserve) |
| 1110 | (reserve) |
| 1111 | end |

FIG. 9

Example of management table

| Status signal STA | Next operation | Operation period | Peak period | Peak pitch |
|---|---|---|---|---|
| 0001 | prog | tsp | tpp x 1 | |
| 0010 | pvfy1 | tsv1 | tpv x 2 | tsvp |
| 0011 | pvfy2 | tsv2 | tpv x 3 | tsvp |
| 0100 | pvfy3 | tsv3 | tpv x 4 | tsvp |
| 0101 | pvfy4 | tsv4 | tpv x 5 | tsvp |
| 0110 | pvfy5 | tsv5 | tpv x 6 | tsvp |

FIG. 10

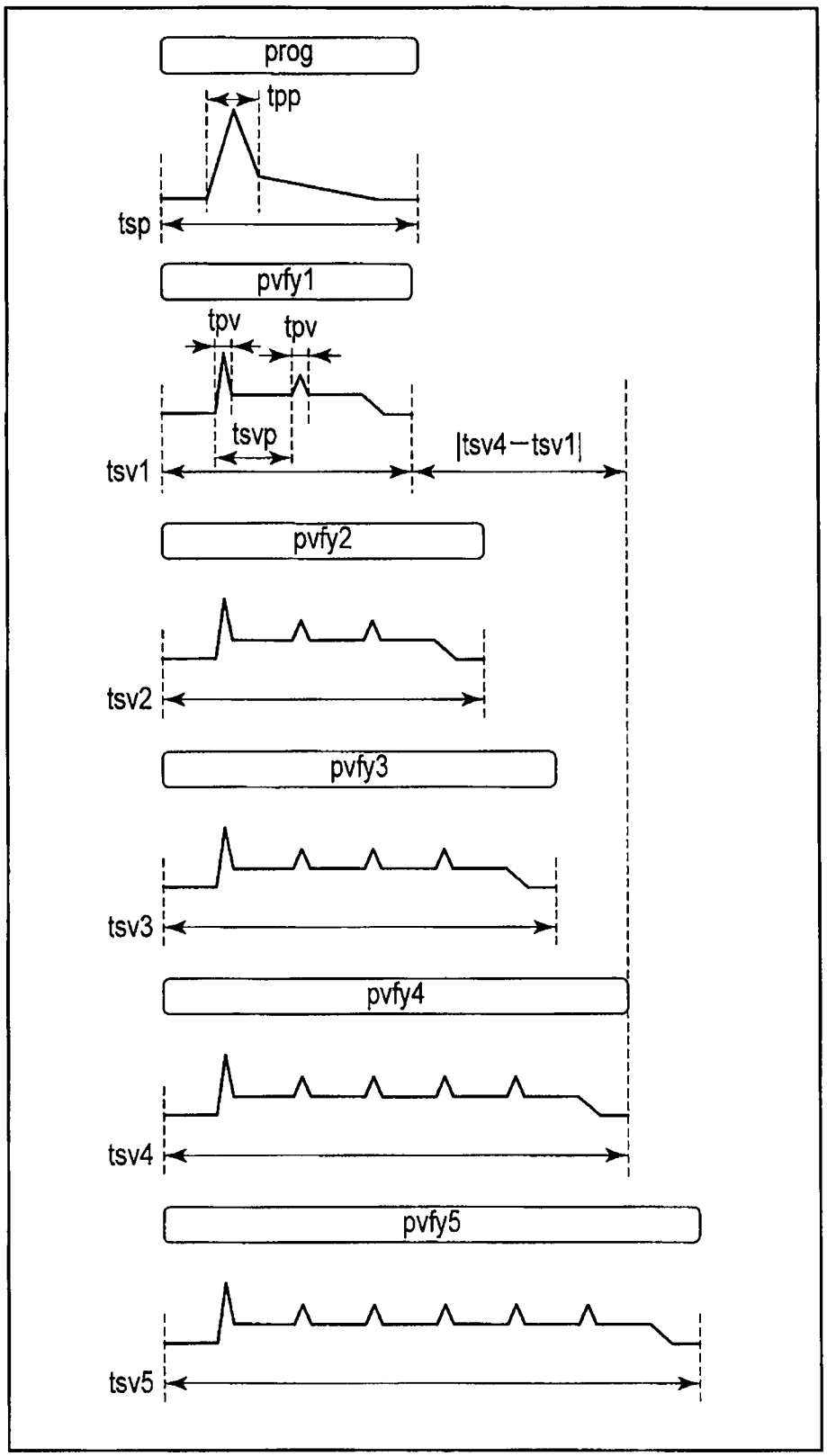
F I G. 11

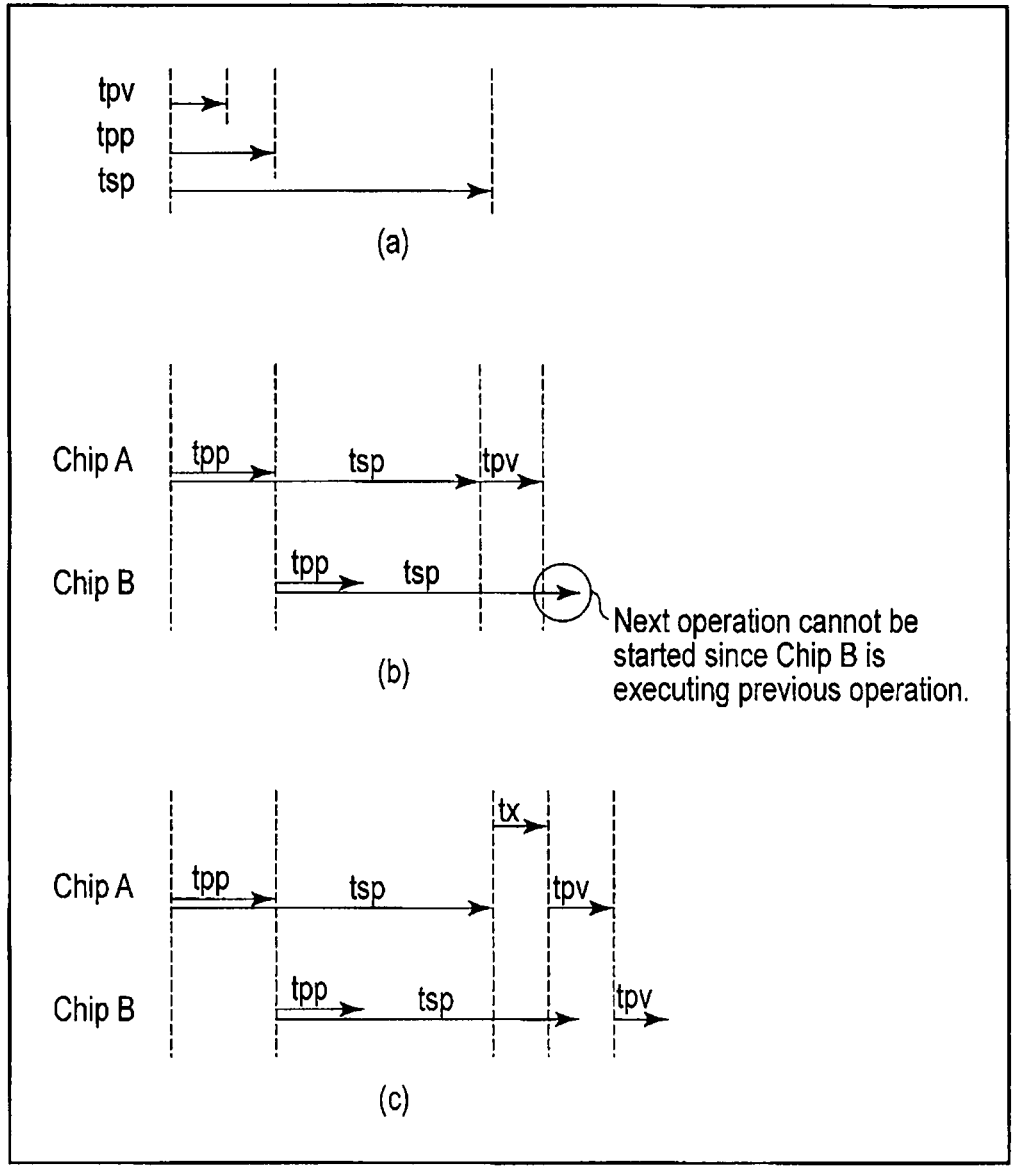
F I G. 20

SEMICONDUCTOR MEMORY SYSTEM WITH CURRENT CONSUMPTION CONTROL

CROSS-REFERENCE TO RELATED APPLICATIONS

This application is based upon and claims the benefit of priority from prior Japanese Patent Application No. 2011-088340, filed Apr. 12, 2011, the entire contents of which are incorporated herein by reference.

FIELD

Embodiments described herein relate generally to a semiconductor memory system.

BACKGROUND

In recent years, a semiconductor memory (e.g. NAND flash memory) has been applied to various memory systems, and accordingly there has been a challenging how to increase the memory capacity thereof. To achieve this, memory chips are mounted in a storage device, and multilevel configuration, for instance, is adopted, thereby to realize a large memory capacity. In such a storage device, memory chips are controlled by a memory controller.

However, in a memory system (semiconductor memory system) using the semiconductor memory, it is difficult to increase the speed. This is conspicuous in a semiconductor memory with a fine structure, or a multilevel semiconductor memory. Thus, the memory controller executes control to perform data program operations in parallel in memory chips.

When program operations are executed in parallel, is an overlap of peak periods of electric currents consumed in the respective memory chips. If the peak periods of consumption currents of the memory chips overlap, a very large current is temporarily consumed in the semiconductor system, and this adversely affects other parts, leading to degradation in capability of the semiconductor system.

BRIEF DESCRIPTION OF THE DRAWINGS

FIG. 1 shows a semiconductor memory.
FIG. 5 illustrates a case in which semiconductor memories perform different operations.
FIG. 6 shows a semiconductor memory.
FIG. 9 shows examples of an advance-notice signal.
FIG. 10 shows an example of a management table.
FIG. 11 shows an example of a condition for issuing a restart instruction.
FIG. 20 illustrates a start timing of program verify.

DETAILED DESCRIPTION

Figure 2:
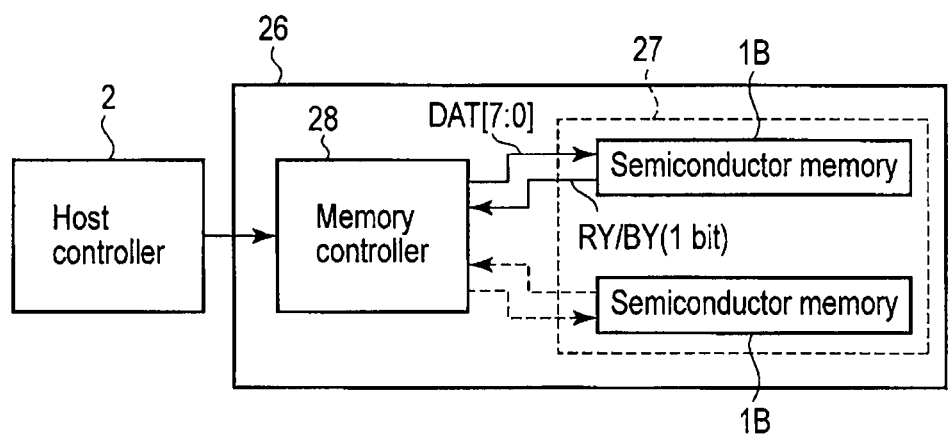
FIG. 2 shows a semiconductor memory system.

In general, according to one embodiment, a semiconductor memory system comprising: semiconductor memories; and a memory controller configured to control the semiconductor memories, wherein each of the semiconductor memories is configured to execute an internal sequence including operations and have a wait period after an end of each of the operations, to notify, during the wait period, a status signal, which notifies in advance a start of a next operation, to the memory controller, and to start the next operation upon receiving a restart instruction of the internal sequence from the memory controller, and the memory controller is configured to notify, upon receiving the status signal from a predetermined semiconductor memory of the semiconductor memories, the restart instruction to the predetermined semiconductor memory, on condition that a peak period of current of the next operation of the predetermined semiconductor memory does not overlap with a peak period of current of the semiconductor memories excluding the predetermined semiconductor memory.

Various embodiments will be described hereinafter with reference to the accompanying drawings.

FIG. 1 shows semiconductor memory 1B as a comparative example.

Semiconductor memory (memory chip) 1 includes memory cell array 11, and data register 12 which temporarily stores program data or read data.

Sense amplifier 13 senses read data and amplifies it. Column address buffer 14 buffers a column address signal. Column address decoder 15 decodes a column address signal, and selects a column of memory cell array 11.

In this example, with respect to selected 8 columns, transfer of program data/read data (8 bit DAT[7:0]) is executed between data register 12 and input/output (I/O) circuit 16.

Row address buffer 17 buffers a row address signal. Row address decoder 18 decodes a row address signal and selects one row (e.g. 1 page) of memory cell array 11.

Address register 19 temporarily stores the row address signal and column address signal. Command register 20 temporarily stores command signals for selecting, for example, a program operation, a read operation and an erase operation.

Status register 21 temporarily stores a result (status pass/ status fail) of a program verify operation. This result is transferred via I/O circuit 16 to a memory controller which is provided on the outside of semiconductor memory 1, and further to a host controller.

Control circuit 22 controls various operations, such as a program operation, a read operation and an erase operation, for memory cell array 11.

Logic circuit 23 receives chip enable signal CE, command latch enable signal CLE, address latch enable signal ALE, write enable signal WE, read enable signal RE, and write protect signal WP, and instructs an operation which is to be executed by control circuit 22, on the basis of these control signals.

Chip enable signal CE determines select/non-select of a chip.

When command latch enable signal CLE is in an enable state, input data (command signal) is transferred to command register 20. When address latch enable signal ALE is an enable state, input data (row/column address signal) is transferred to address register 19.

When write enable signal WE is in an enable state, a program operation is executed. When read enable signal RE is in an enable state, a read operation is executed. Write protect signal WP is a signal indicative of permission/prohibition of overwrite. When write protect signal WP is in an enable state, write is prohibited, and thus already stored data is not changed.

High voltage generation circuit 24 generates a high voltage, for example, which is used at a time of a program operation, and supplies the high voltage to memory cell array 11.

State detection circuit 25 detects the present state of semiconductor memory 1, and notifies it to the memory controller. For example, when semiconductor memory 1 is in operation, ready/busy signal RY/BY indicates a busy state. When semiconductor memory 1 in a wait state, ready/busy signal RY/BY indicates a ready state.

FIG. 2 shows a semiconductor memory system which uses the semiconductor memory of FIG. 1.

Storage device 26 is a data storage product, such as an SSD, a memory card, or a USB memory.

Storage device 26 includes memory module 27 and memory controller 28. Memory module 27 includes semiconductor memories 1B, 1B, . . . . Memory controller 28 and semiconductor memories 1B, 1B, . . . , are mutually connected via a data bus.

Memory controller 28 transfers command signals from host controller 2 to semiconductor memories 1, 1, . . . . Transfer bit width DAT[7:0] of data between memory controller 28 and semiconductor memories 1B, 18, . . . , is 8 bits in this example, but is not limited to 8 bits.

In the semiconductor memory system shown in FIG. 2, when the speed of program is to be increased, for example, memory controller 28 executes control to perform data program operations in parallel in semiconductor memories 1B, 1B, . . . .

Figure 3:
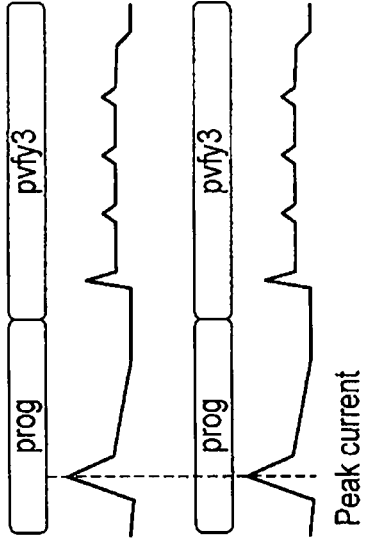
FIG. 3 illustrates a case in which semiconductor memories perform identical operations.

FIG. 3 illustrates an example of control to execute program in two semiconductor memories A and B in parallel by identical operations. In FIG. 3, "prog" represents a program operation, "pvfy3" represents a program verify operation, and "wait" represents a wait state.

If two semiconductor memories A and B are simply operated in parallel, peak periods of consumption currents, which are consumed by two semiconductor memories A and B, overlap, and a very large current is temporarily consumed in the semiconductor memory system, and this is undesirable ("With no peak current control").

In order to avoid the overlap of peak periods of consumption currents, the internal sequences of two semiconductor memories A and B better are displaced. Specifically, time points, at which two semiconductor memories A and B start program operations, are displaced from each other ("With peak current control").

Therefore, as regards the program operation of semiconductor memory systems in recent years, two semiconductor memories rarely perform identical operations.

However, for example, data programming is constituted by a combination of a program operation and a verify operation. Even if the program operation can be performed by identical operations, the verify operation varies, for example, depending on whether a program method, such as QPW (Quick Pass Write), is to be adopted or not, or which bits are programmed in the case of a multilevel memory in which bits are stored in one memory cell.

Figure 4:
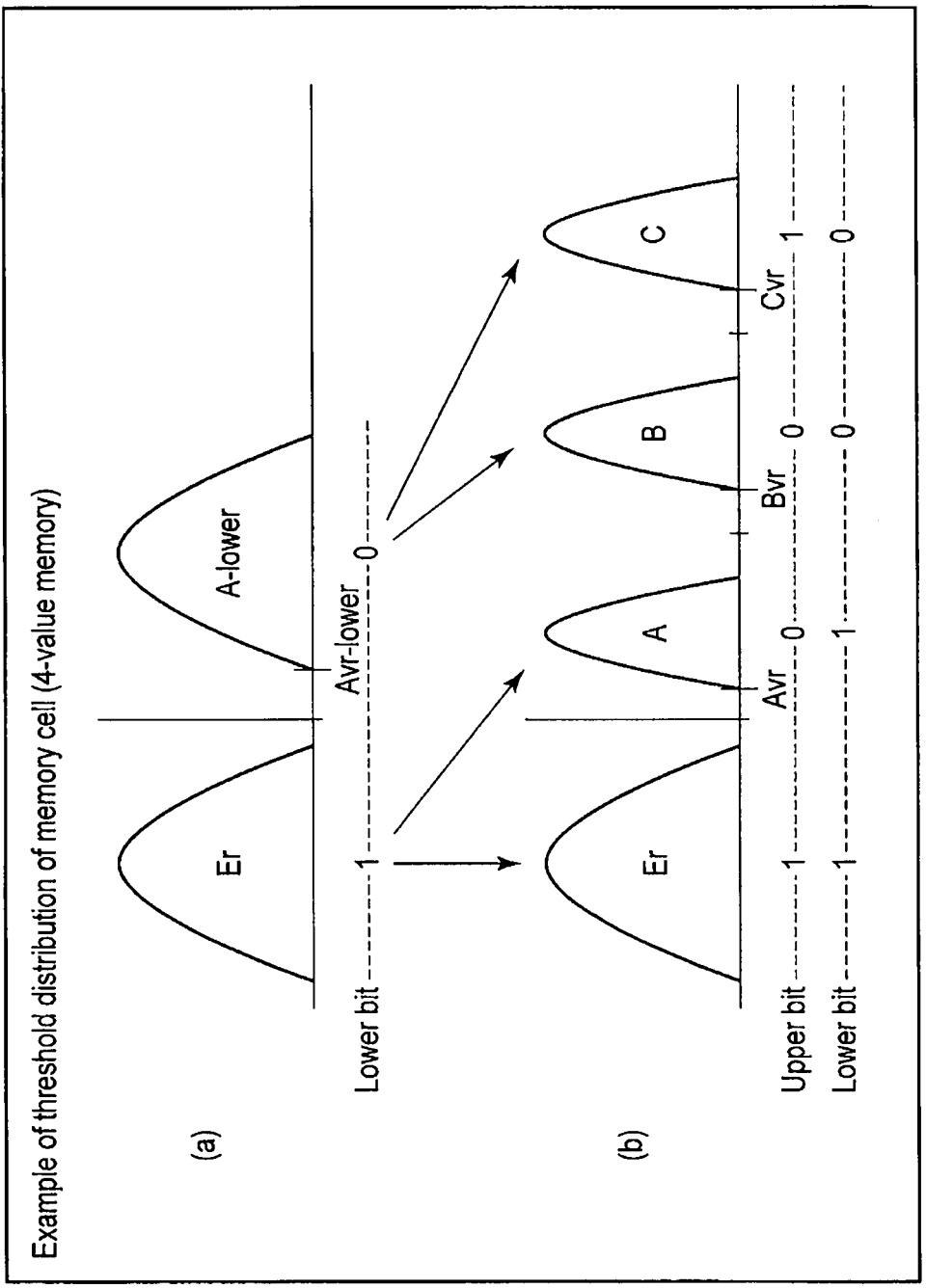
FIG. 4 illustrates an example of a threshold distribution of a memory cell.

FIG. 4 shows an example of a threshold distribution of a 4-value memory.

In this example, a verify operation for verifying whether write tp threshold distribution A-lower has been executed in the case of performing program of a lower bit from erase state Er, may be executed only once with use of verify read potential Avr-lower.

On the other hand, when program of an upper bit is executed from the state in which a lower bit is already programmed. Thus, the verify operation for verifying whether write to threshold distributions A, B and C has been executed, is executed three times at maximum with use of verify read potentials Avr, Bvr and Cvr.

Hence, even if two semiconductor memories A and B are operated in parallel, there is a case in which verify periods thereof are different from each other. Owing to this, there is a case in which useless time occurs in either of them and the speed of program cannot be sufficiently increased.

FIG. 5 illustrates an example of control to execute program in two semiconductor memories A and B by different operations. In FIG. 5, "prog" represents a program operation, "pvfy1, pvfy5" represents a program verify operation, and "wait" represents a wait state.

In this example, the program period of semiconductor memory A is tsp, the verify period thereof is tsv1, the program period of semiconductor memory B is tsp, and the verify period thereof is tsv5.

In this case, it is assumed that tsv1<tsv5, and tsv5 is the longest verify period.

If two semiconductor memories A and B are simply operated in parallel, peak periods of consumption currents, which are consumed by two semiconductor memories A and B, overlap, and a very large current is temporarily consumed in the semiconductor memory system, and this is undesirable ("With no peak current control").

The overlap of peak periods of consumption currents can be avoided if time points, at which two semiconductor memories A and B start program operations, are displaced from each other ("With peak current control").

However, after the memory controller transferred commands to start program and program data to two semiconductor memories A and B, the memory controller usually issues no new instruction to two semiconductor memories A and B until receiving results of program completion from two semiconductor memories A and B (status pass: the result of the verify operation indicates that data write to write target memory cells has normally been finished/status fail: the result of the verify operation indicates that data write to write target memory cells has failed to be normally finished).

In this case, the memory controller is assuming that one-time data programming is constituted by program period tsp and maximum verify period (worst case) tsv5, two semiconductor memories A and B repeatedly execute the data programming until the result of program completion indicates status pass.

At this time, since the actual verify period of semiconductor memory A is tsv1, semiconductor memory A keeps the wait state "wait" from the end of verify operation pvfy1 until semiconductor memory B completes verify operation pvfy5, and this time period becomes useless.

As described above, when program in semiconductor memories is executed in parallel, if the respective semiconductor memories perform different operations, useless time occurs in a semiconductor memory which has a short verify period.

Taking the above into account, in the embodiment described below, there is proposed a technique wherein in a semiconductor memory system including semiconductor memories (memory chips) and a memory controller which controls these semiconductor memories, each semiconductor memory transitions to a wait state after completing each operation in the internal sequence (e.g. program operation, verify operation), and the memory controller controls the restart of the internal sequence executed by each semiconductor memory, independently in association with each operation.

Specifically, each of the semiconductor memories executes the internal sequence including successive operations and has a wait period after the end of each operation, and notifies during the wait period a status signal of 2 bits or more, which notifies in advance the start of the next operation, to the memory controller. In addition, when each of the semiconductor memories has received, during the wait period, a restart instruction of the internal sequence from the controller, each of the semiconductor memories starts the next operation.

Besides, the memory controller includes a management table relating to operation periods and peak periods of electric current consumed during the operation periods with respect to the respective operations. When the memory controller has received a status signal from a predetermined semiconductor memory of the semiconductor memories, the memory controller notifies, based on the management table, a restart instruction to the predetermined semiconductor memory, on condition that the peak period of the next operation of the predetermined semiconductor memory does not overlap the peak periods of the semiconductor memories excluding the predetermined semiconductor memory.

Thereby, when program is executed in parallel in the semiconductor memories, even if the respective semiconductor memories perform different operations, useless time is prevented from occurring in the semiconductor memory which has a short verify period.

FIG. 6 shows semiconductor memory 1 as the embodiment.

The feature of semiconductor memory 1 resides in control circuit 22' and status signal generation circuit 32.

Control circuit 22' executes the internal sequence including successive operations (e.g. program operation, verify operation) and provides a wait period after the end of each operation, and instructs, during the wait period, status signal generation circuit 32 to generate a status signal STA of 2 bits or more, which notifies in advance the start of the next operation.

Status signal generation circuit 32 generates status signal STA and notifies it to the memory controller. In addition, control circuit 22' starts the next operation, upon receiving a restart instruction of the internal sequence from the memory controller.

As regards the other structure, this semiconductor memory may be the same as the semiconductor memory (FIG. 1) of the comparative example, so a detailed description thereof is omitted, with the same reference numerals as in FIG. 1 being added.

Specifically, as shown in FIG. 1, in the semiconductor memory of the comparative example, the memory controller can recognize the state of semiconductor memory 1 by only ready/busy signal (1 bit) RY/BY. By contrast, as shown in FIG. 6, in the semiconductor memory of the embodiment, the memory controller can successively recognize the state of the semiconductor memory by status signal STA of, for example, 2 bits or more.

Figure 7:
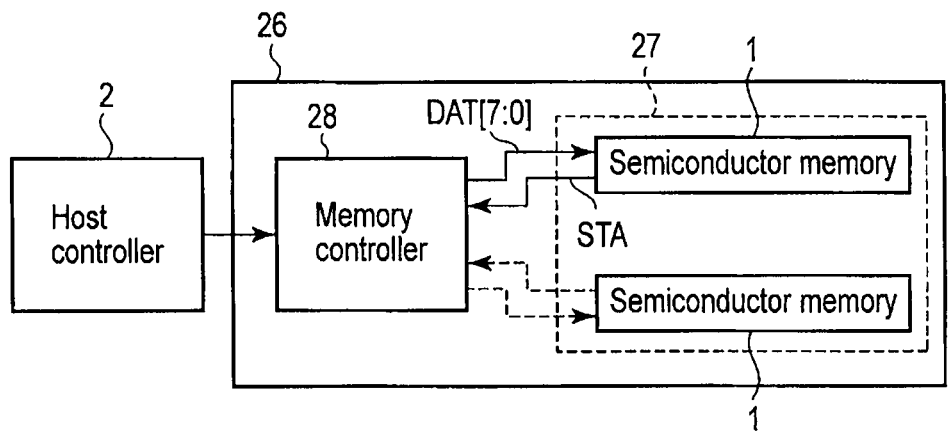
FIG. 7 shows a semiconductor memory system.

FIG. 7 shows a semiconductor memory system which uses the semiconductor memory of FIG. 6.

Storage device 26 is a data storage product, such as an SSD, a memory card, or a USB memory.

Storage device 26 includes memory module 27 and memory controller 28. Memory module 27 includes semiconductor memories 1, 1, . . . . Memory controller 28 and semiconductor memories 1, 1, . . . , are mutually connected via a data bus.

Memory controller 28 receives status signal STA from semiconductor memories 1, 1, . . . , and issues restart instructions of the internal sequences to semiconductor memories 1, 1, . . . . Transfer bit width DAT[7:0] of data between memory controller 28 and semiconductor memories 1, 1, . . . , is 8 bits in this example, but is not limited to 8 bits.

Figure 8:
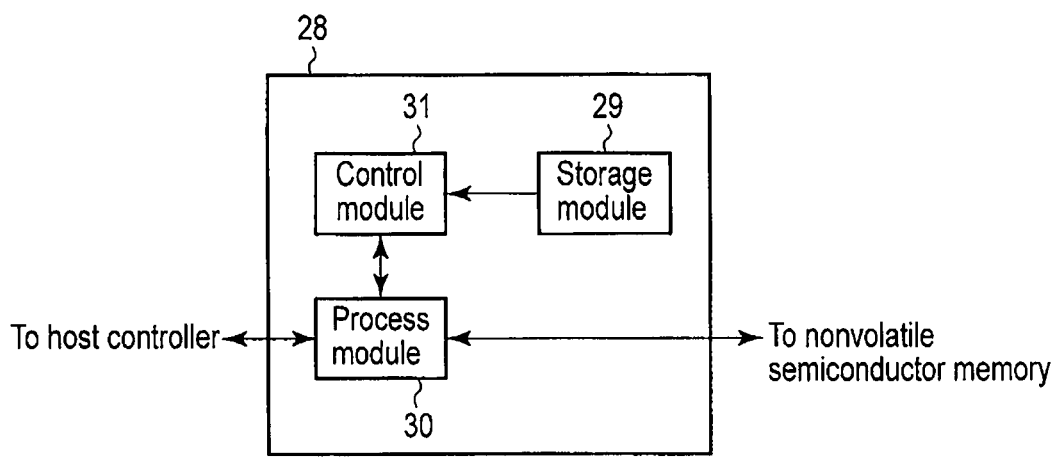
FIG. 8 shows a memory controller.

FIG. 8 shows the memory controller of FIG. 7.

Memory controller 28 includes storage module 29, process module 30 and control module 31.

Storage module 29 stores a management table relating to operation periods and peak periods of electric current consumed during the operation periods with respect to the respective operations in the internal sequence (e.g. program operation, verify operation) which is executed by semiconductor memories 1, 1, . . . , shown in FIG. 7. In the meantime, storage module 29 may be disposed within semiconductor memory 1.

For example, when status signal STA has, e.g. 4 bits, and the relationship between status signal STA and the next operation is set to be the relationship shown in FIG. 9, the management table relating to the program operation and verify operations is as shown in FIG. 10.

In FIG. 9 and FIG. 10, "(not wait)" indicates that an operation is currently being continued, "prog" represents a program operation, "pvfy1~pvfy5" represent verify operations after program operations, "read1~read3" represent read operations, "erase" represents an erase operation, "evfy" represents a verify operation after an erase operation, "(reserve)" represents a reserve, and "end" represents the end of the internal sequence.

In addition, the operation period of program operation prog is tsp, the peak period at which peak current occurs is tpp, the operation periods of program verify operations pvfy1, pvfy2, pvfy3, pvfy4 and pvfy5 are tsv1, tsv2, tsv3, tsv4 and tsv5, respectively, the peak period at which peak current occurs is tpv, and the pitch (peak pitch) of peak current is tsvp. Peak period tpv is a time period from a rising edge toward a peak position to a part at which a variation amount of current from the peak position has decreased.

It is assumed that peak periods tpv and peak pitches tsvp of program verify operations pvfy1, pvfy2, pvfy3, pvfy4 and pvfy5 are substantially equal, peak period tpv of verify operation pvfy1 occurs twice in operation period tsv1, peak period tpv of verify operation pvfy2 occurs three times in operation period tsv2, peak period tpv of verify operation pvfy3 occurs four times in operation period tsv3, peak period tpv of verify operation pvfy4 occurs five times in operation period tsv4, and peak period tpv of verify operation pvfy5 occurs six times in operation period tsv5.

Further, it is assumed that tsv1<tsv2<tsv3<tsv4<tsv5, and that tsv5 is the longest verify period in this embodiment.

However, the above-described relationship is merely an example, and the management table stored in storage module 29 is not limited to this. In addition, peak period tpv may differ between the respective verify operations. When peak periods are present in one verify operation, the respective peak periods may be different.

Process module 30 in the memory controller 28 has received status signal STA from one semiconductor memory of semiconductor memories 1. Control module 31 in memory controller 28 has received status signal STA from process module 30. In this time, control module 31 notifies, for example, based on the management table of FIG. 10, a restart instruction of the internal sequence to the predetermined semiconductor memory through process module 30, on condition that peak period tpp, tpv of the next operation of the predetermined semiconductor memory does not overlap peak periods tpp, tpv of semiconductor memories 1, 1, . . . , shown in FIG. 7, excluding the predetermined semiconductor memory. When peak periods are present in one verify operation, it may be possible to prevent overlapping between peak periods tpv_m at which highest peak current m flows, or between peak period tpp and peak period tpv_m. There is a tendency that peak period tpv_m increases in the case of a verify read potential (e.g. verify read potential Avr) which verifies a low threshold distribution (e.g. threshold distribution A).

Thereby, when program is executed in parallel in semiconductor memories, even if the respective semiconductor memories perform different operations, each semiconductor memory transitions to a wait state after completing each operation in the internal sequence, and the memory controller controls the restart of the internal sequence executed by each semiconductor memory, independently in association with each operation, and therefore no useless time occurs, for example, in a semiconductor memory having a short verify period.

FIG. 11 illustrates an example of the condition for issuing a restart instruction of the internal sequence.

It is assumed that the memory controller causes the respective semiconductor memories to execute in parallel identical object operations (program verify operation in this example), on condition that peak periods tpv of the respective semiconductor memories do not overlap.

In addition, it is assumed that the program verify operation, which is executed after program operation prog, is selected from among five kinds (pvfy1, pvfy2, pvfy3, pvfy4, pvfy5), and the operation periods of the program verify operations of at least two of the semiconductor memories are different.

The condition for issuing the restart instruction of the internal sequence to a predetermined semiconductor memory, when the memory controller has received from the predetermined semiconductor memory a status signal indicative of the end of the program verify operation, is as follows.

All semiconductor memories are in a wait state, or
Of the program verify operations which are executed in parallel, a difference between the operation period of the program verify operation of a predetermined semiconductor memory and the longest operation period is reference value α or more.

For example, if two semiconductor memories A and B are considered for the purpose of simplicity, when the operation period of program verify operation pvfy1 of semiconductor memory A is tsv1 and the operation period of program verify operation pvfy4 of semiconductor memory B is tsv4, the memory controller issues the restart instruction to the predetermined semiconductor memory on condition that |tsv4−tsv1|>reference value α. Reference value α is such a time that the next operation of the semiconductor memory, which is operated in parallel, can be executed during this reference value α. In addition, when starts of operation periods of semiconductor memories, which are operated in parallel, are different, such different times are also considered in reference value α. For example, if the controller has issued the restart instruction to semiconductor memory B when time tx of semiconductor memory A has passed, reference value α is set by subtracting tx from the time in which the next operation of the semiconductor memory can be executed.

Next, a description is given of an example of the internal sequences in the case where data programming is executed in parallel in two semiconductor memories A and B.

Figure 12:
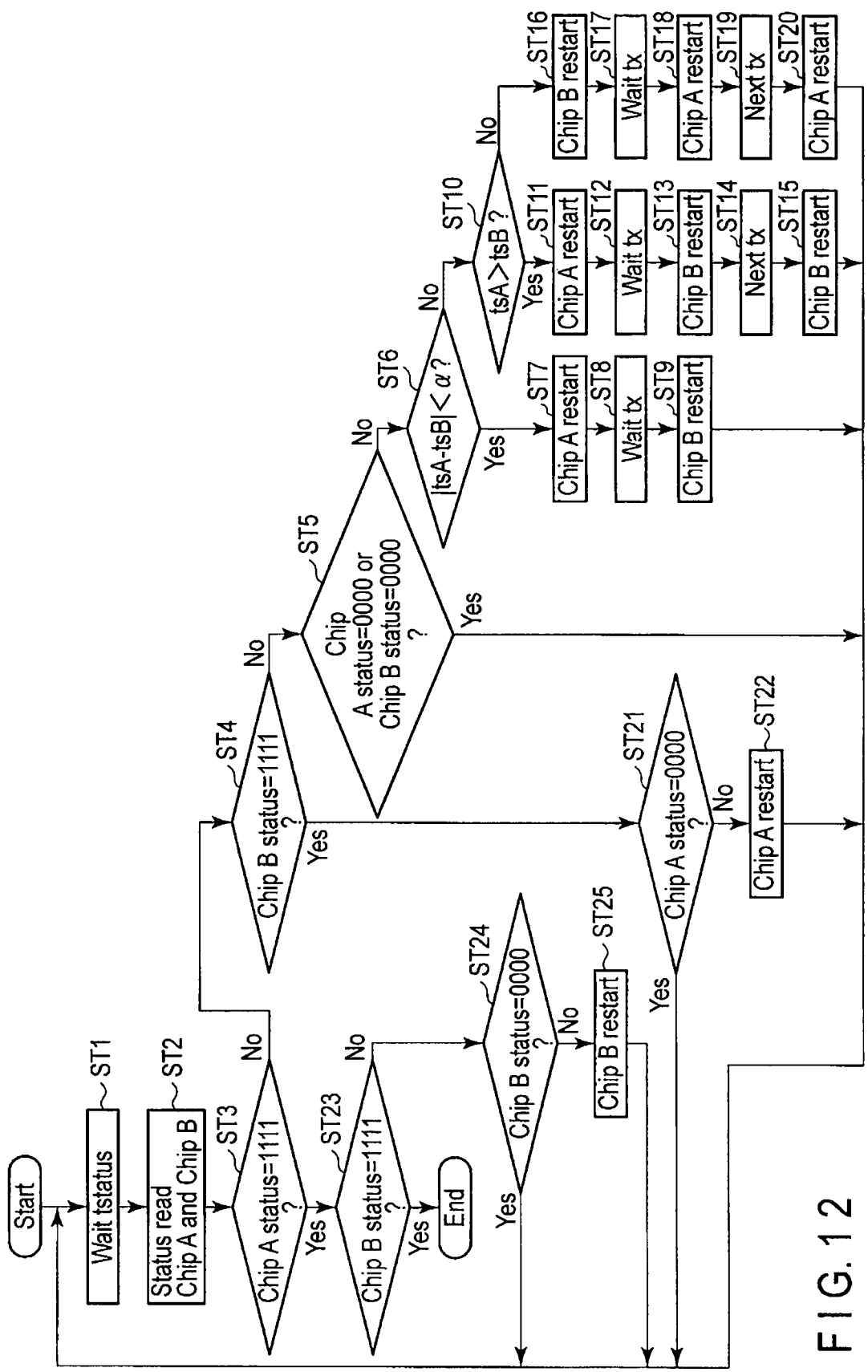
FIG. 12 is a flow chart illustrating the operation of the memory controller.
Figure 13:
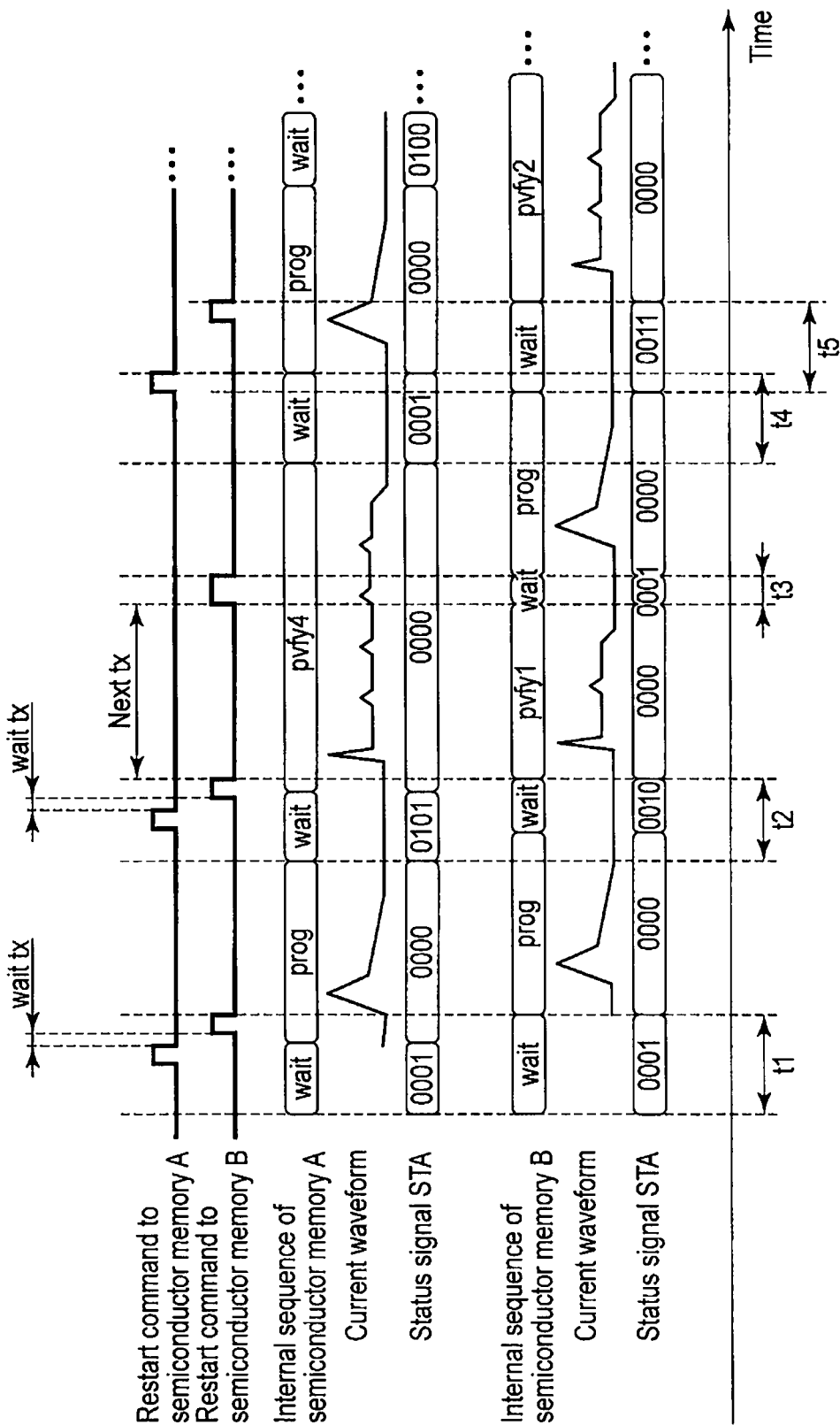
FIG. 13 shows an embodiment of internal sequences.

FIG. 12 is a flow chart illustrating the operation of the memory controller, and FIG. 13 illustrates the internal sequences of two semiconductor memories A and B.

The memory controller issues program commands, program addresses and program data to two semiconductor memories A and B, respectively. Semiconductor memories A and B start the internal sequences of data programming after receiving the program commands from the memory controller.

[Period t1 of the Internal Sequence of FIG. 13]

To begin with, if semiconductor memories A and B have received program commands, semiconductor memories A and B set their internal sequences in "wait", and output "0001 (program operation prog)" as status signals STA to the memory controller.

Based on status signals STA, the memory controller recognizes that two semiconductor memories A and B are both in the wait state prior to starting program operation prog. Then, the memory controller issues restart instructions of internal sequences to two semiconductor memories A and B.

In this case, in order to displace peak periods of current consumed in two semiconductor memories A and B, the timing of outputting the restart command to semiconductor memory A is made different from the timing of outputting the restart command to semiconductor memory B. In this example, when time tx has passed since the restart command to semiconductor memory A was output, the restart command to semiconductor memory B is output. In this case, tx is a period for shifting the peak periods of consumption current of two semiconductor memories A and B.

Specifically, as in steps ST1 and ST2 in FIG. 12, after wait time "tstatus" of the memory controller, the memory controller confirms, based on status signal STA, status information of semiconductor memory A (chip A) and semiconductor B (chip B) (Wait tstatus→Status read chip A and chip B).

Next, as in steps ST3 and ST4 in FIG. 12, the memory controller confirms that the status information of two semiconductor memories A and B is not indicative of the reception of the end (the result of program completion: status pass or status fail) of the internal sequence of data programming (Chip A status=1111?→No, Chip B status=1111?→No).

Subsequently, as in step ST5 in FIG. 12, the memory controller confirms that each of two semiconductor memories A and B does not continue an operation in the internal sequence (Chip A status=0000? or Chip B status=0000?→No).

Next, as in step ST6 in FIG. 12, the memory controller calculates |tsA−tsB|<reference value α, based on the management table. In this case, tsA is the operation period of the next operation which is indicated by the status information of semiconductor memory A, and tsB is the operation period of the next operation which is indicated by the status information of semiconductor memory B.

Specifically, since the next operation indicated by the status information of each of two semiconductor memories A and B is program operation prog, tsA=tsB=tsp, for instance, according to the example of the management table of FIG. 10.

Accordingly, in step ST6 in FIG. 12, the memory controller determines that |tsA−tsB|<α?→Yes, and executes steps ST7 to ST9.

For example, the memory controller first outputs the restart command to semiconductor memory A (Chip A restart), and then outputs, for example, after the passage of time tx (wait tx), the restart command to semiconductor memory B (Chip B restart). In this case, tx is the period for shifting the peak periods of consumption current of two semiconductor memories A and B, and is set to be, for example, tx=tpp, wherein tpp is the peak period of current consumed in the program operation.

[Period t2, t3 of the Internal Sequence of FIG. 13]

To begin with, if program operation prog of semiconductor memory A ends, semiconductor memory A transitions to wait state "wait", and outputs "0101 (program verify pvfy4)" as status signal STA to the memory controller.

Subsequently, if the program operation prog of semiconductor memory B ends, semiconductor memory B transitions to wait state "wait", and outputs "0010 (program verify pvfy1)" as status signal STA to the memory controller.

Based on status signals STA, the memory controller recognizes that semiconductor memory A is in the wait state prior to starting program verify operation pvfy4, and also recognizes that semiconductor memory B is in the wait state prior to starting program verify operation pvfy1.

Then, the memory controller issues restart instructions of the internal sequences to two semiconductor memories A and B.

In this case, in order to displace peak periods of current consumed in two semiconductor memories A and B, the timing of outputting the restart command to semiconductor memory A is made different from the timing of outputting the restart command to semiconductor memory B. In this example, when time tx has passed since the restart command to semiconductor memory A was output, the restart command to semiconductor memory B is output.

Specifically, as in steps ST1 and ST2 in FIG. 12, after wait time "tstatus" of the memory controller, the memory controller confirms, based on status signal STA, status information of semiconductor memory A (chip A) and semiconductor B (chip B) (Wait tstatus→Status read chip A and chip B).

Next, as in steps ST3 and ST4 in FIG. 12, the memory controller confirms that the status information of two semiconductor memories A and B is not indicative of the end of the internal sequence of data programming (Chip A status ~1111?→No, Chip B status=1111?→No).

Subsequently, as in step ST5 in FIG. 12, the memory controller confirms that each of two semiconductor memories A and B does not continue an operation in the internal sequence (Chip A status=0000? or Chip B status=0000?→No).

Next, as in step ST6 in FIG. 12, the memory controller calculates |tsA−tsB|<reference value α, based on the management table. In this case, tsA is the operation period of the next operation which is indicated by the status information of semiconductor memory A, and tsB is the operation period of the next operation which is indicated by the status information of semiconductor memory B.

Specifically, since the next operation indicated by the status information of semiconductor memory A is program verify operation pvfy4, tsA=tsv4, for instance, according to the example of the management table of FIG. 10. In addition, since the next operation indicated by the status information of semiconductor memory B is program verify operation pvfy1, tsB=tsv1, for instance, according to the example of the management table of FIG. 10.

If it is supposed that |tsA−tsB|≥reference value α, the memory controller determines, in step ST6 in FIG. 12, that |tsA−tsB|<α?→No, and subsequently confirms whether tsA>tsB, or not, as shown in step ST10 in FIG. 12.

The memory controller executes steps S11 to ST15 when tsA>tsB, and executes steps ST16 to ST20 when tsA<tsB.

Steps ST11 to ST15 of the former case correspond to the case in which the operation period of semiconductor chip B is shorter than the operation period of semiconductor chip A. This case is characterized in that after the operation of semiconductor chip B is finished, the next operation of semiconductor chip B is restarted before the operation of semiconductor chip A is finished, thereby to eliminate useless time occurring in semiconductor chip B.

In this case, there arises no problem even if steps ST11 to ST12 and steps ST13 to ST14 are transposed.

Similarly, steps ST16 to ST20 of the latter case correspond to the case in which the operation period of semiconductor chip A is shorter than the operation period of semiconductor chip B. This case is characterized in that after the operation of semiconductor chip A is finished, the next operation of semiconductor chip A is restarted before the operation of semiconductor chip B is finished, thereby to eliminate useless time occurring in semiconductor chip A.

In this case, there arises no problem even if steps ST16 to ST17 and steps ST18 to ST19 are transposed.

In the example of the internal sequences in FIG. 13, operation period tsA (=tsv4) of program verify operation pvfy4 of semiconductor memory A is longer than operation period tsB (=tsv1) of program verify operation pvfy1 of semiconductor memory B.

Accordingly, in step ST10 in FIG. 12, the memory controller determines that tsA>tsB?→Yes, and subsequently executes steps ST11 to ST15 in FIG. 12.

For example, the memory controller first outputs the restart command to semiconductor memory A (Chip A restart), and then outputs, for example, after the passage of time tx (wait tx), the restart command to semiconductor memory B (Chip B restart). In this case, tx is the period for shifting the peak periods of consumption currents of two semiconductor memories A and B, and "wait tx" in step ST12 is set to be, for example, tx=tpv, wherein tpv is peak period tpv of current consumed in the verify operation.

Thereafter, when program verify operation pvfy1 of semiconductor memory B is finished, semiconductor memory B transitions to wait state "wait". If data write in all of the memory cells that are to be programmed has not been completed (if there is a memory cell which has been determined to be NG in verify read), semiconductor memory B outputs "0001 (program operation prog)" as status signal STA to the memory controller. In this case, the program operation may be executed with a program voltage which is raised by a predetermined value.

In addition, the memory controller outputs a restart command to semiconductor memory B after "Next tx" in ST14 from the previous restart command (ST13) to semiconductor memory B. In the example of the internal sequence in FIG. 13, Next tx=tsv1. At the time point when the memory controller outputted the restart command of ST13 to semiconductor memory B, the memory controller outputted "0010 (program verify operation pvfy1)" as status signal STA to the memory controller. Specifically, at the time point when the memory controller ST13 outputted the restart command of ST13 to semiconductor memory B, it was understood that Next tx=tsv1, from the example of the management table shown in FIG. 10. As a result, without receiving status signal STA from semiconductor memory B, the memory controller can immediately output the restart command to semiconductor memory B, and can shorten the operation time of semiconductor memory B.

[Period t4, t5 of the Internal Sequence of FIG. 13]

If program verify operation pvfy4 of semiconductor memory A ends, semiconductor memory A transitions to wait state "wait", and outputs "0001 (program operation prog)" as status signal STA to the memory controller.

Based on status signals STA, the memory controller recognizes that semiconductor memory A is in the wait state prior to starting program operation prog. At this time, semiconductor memory B is executing the next program.

Thus, after confirming that program operation prog of semiconductor memory B has ended, the memory controller issues a restart instruction of the internal sequence to semiconductor memory A.

Specifically, as in steps ST1 and ST2 in FIG. 12, after wait time "tstatus" of the memory controller, the memory controller recognizes, based on status signal STA, status information of semiconductor memory A (chip A) and semiconductor B (chip B) (Wait tstatus→Status read chip A and chip B).

Next, as in steps ST3 and ST4 in FIG. 12, the memory controller confirms that two semiconductor memories A and B are not indicative of the end of the internal sequence of data programming (Chip A status=1111?→No, Chip B status=1111?→No).

Subsequently, as in step ST5 in FIG. 12, the memory controller confirms that each of two semiconductor memories A and B does not continue an operation in the internal sequence (Chip A status=0000? or Chip B status=0000?→Yes).

In this example, since semiconductor memory B is continuing next program operation prog, the memory controller delays the timing of issuing the restart instruction to semiconductor memory A, until the end of program operation of semiconductor memory B. Specifically, returning to ST1, this operation (ST1→ST2→ST3→ST4→ST5→ST1) is repeated until status signal STA of semiconductor memory B, which is different from "0000", is received.

If program operation prog of semiconductor memory B is finished, semiconductor memory B transitions to wait state "wait", and outputs "0011 (program verify operation pvfy2)" as status signal STA to the memory controller.

Based on status signal STA from semiconductor memory B, the memory controller recognizes that semiconductor memory B is in the wait state prior to starting program verify operation pvfy2.

Then, the memory controller first issues the restart instruction of the internal sequence to semiconductor memory A, and then issues the restart instruction of the internal sequence to semiconductor memory B.

Specifically, as in step ST6 in FIG. 12, the memory controller calculates whether |tsA−tsB|<reference value α, or not, based on the management table. In this case, tsA is the operation period of the next operation which is indicated by the status information of semiconductor memory A, and tsB is the operation period of the next operation which is indicated by the status information of semiconductor memory B.

To be specific, since the next operation indicated by the status information of semiconductor memory A is program operation prog, tsA=tsp, for instance, according to the example of the management table of FIG. 10. In addition, since the next operation indicated by the status information of semiconductor memory B is program verify operation pvfy2, tsB=tsv2, for instance, according to the example of the management table of FIG. 10.

If it is supposed, in step ST6 in FIG. 12, that |tsA−tsB|<reference value α→Yes, the memory controller executes steps ST7 to ST9.

For example, the memory controller first outputs the restart command to semiconductor memory A (Chip A restart), and then outputs, for example, after the passage of time tx (wait tx), the restart command to semiconductor memory B (Chip B restart). In this case, tx is the period for shifting the peak periods of consumption currents of two semiconductor memories A and B, and is set to be, for example, tx=tpp.

[Others]

In the internal sequences of FIG. 13, if one of the internal sequences of two semiconductor memories A and B is finished earlier, the other sequence is continued.

Specifically, as in steps ST1 and ST2 in FIG. 12, after wait time "tstatus" of the memory controller, the memory controller recognizes, based on status signal STA, status information of semiconductor memory A (chip A) and semiconductor B (chip B) (Wait tstatus→Status read chip A and chip B).

Next, as shown in steps ST3 and ST4 in FIG. 12, if the memory controller confirms that the status information of semiconductor memory A is indicative of the continuance of the internal sequence and the status information of semiconductor memory B is indicative of the end of the internal sequence (Chip A status=1111?→No, Chip B status=1111?→Yes), the memory controller subsequently executes steps ST21 and ST22 in FIG. 12.

Specifically, until semiconductor memory A completes the internal sequence and the status thereof becomes Chip A status=1111?→Yes, the end of the operation and the restart of the next operation in this internal sequence are repeated.

In addition, as shown in steps ST3 and ST23 in FIG. 12, if the memory controller confirms that the status information of semiconductor memory A is indicative of the end of the internal sequence and the status information of semiconductor memory B is indicative of the continuance of the internal sequence (Chip A status=1111?→Yes, Chip B status=1111?→No), the memory controller subsequently executes steps ST24 and ST25 in FIG. 12.

Specifically, until semiconductor memory B completes the internal sequence and the status thereof becomes Chip B status=1111?→Yes, the end of the operation and the restart of the next operation in this internal sequence are repeated.

Figure 14:
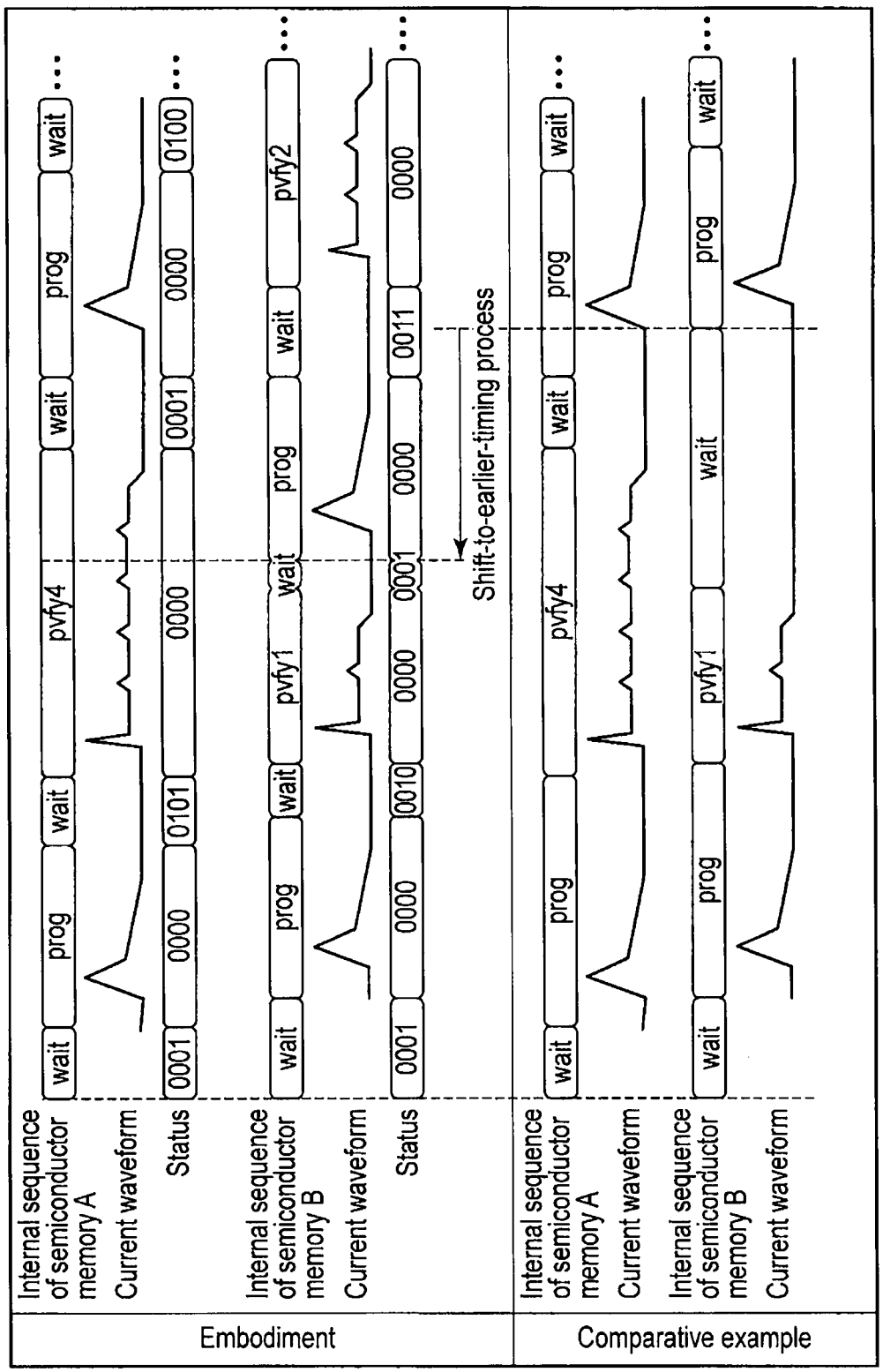
FIG. 14 illustrates a comparison between the embodiment and a comparative example.

FIG. 14 illustrates, by comparison, the internal sequences of the embodiment and the comparative example.

In the comparison, it is presupposed that the operation periods of program verify operations pvfy1 and pvfy4 of two semiconductor memories A and B are different.

In the comparative example, since status information of two semiconductor memories A and B is not issued to the controller, the operation period of the program verify operation is set at a maximum value, taking the worst case into account. Thus, useless time occurs until both of two semiconductor memories A and B transition to the wait state.

By contrast, in the embodiment, the status information of two semiconductor memories A and B is successively issued to the controller as status signals. Thus, after the end of the operation of semiconductor memory B, the memory controller can immediately restart the next operation of semiconductor memory B, without waiting for the end of the operation of semiconductor memory A.

Accordingly, by executing a shift-to-earlier-timing process for shifting the timing of the next operation of semiconductor memory B to an earlier timing, the useless time, which occurs in the comparative example, can be eliminated, the overlap of peak periods of consumption currents at the time of executing program in parallel can be prevented, and the speed of program can be further increased.

In the comparative example, there is no wait period "wait" between the program operation and the verify operation. However, this wait time "wait" is such a length of time (also referred to as "status read time") that the memory controller reads status information of the semiconductor memory, executes an arithmetic operation and to output the restart command, and the wait time "wait" is several μsec and is very short. Even if the status read time and peak period are considered in the wait period, the time of the shift-to-earliertiming process, in which the timing of the next operation of semiconductor memory B is shifted to an earlier timing, is longer than the wait time "wait". For example, wait time "wait" is about 15 μsec, and an one-time verify read is about 25 μsec to 100 μsec. Specifically, there is such a case that the difference in the one-time verify read between semiconductor memories A and B is about 50 μsec. Since wait time "wait" is sufficiently shorter than the difference in the one-time verify read between the semiconductor memories, it is possible to execute data programming at an earlier timing.

Next, a description is given of a technique wherein in a semiconductor memory system including semiconductors (memory chips), two or more semiconductor memories, which are caused to execute the same object operation (e.g. program verify operation) in parallel, are selected, thereby further increasing the speed.

For example, the internal sequence of executing data programming is a repetition of a program operation and a program verify operation.

Figure 15:
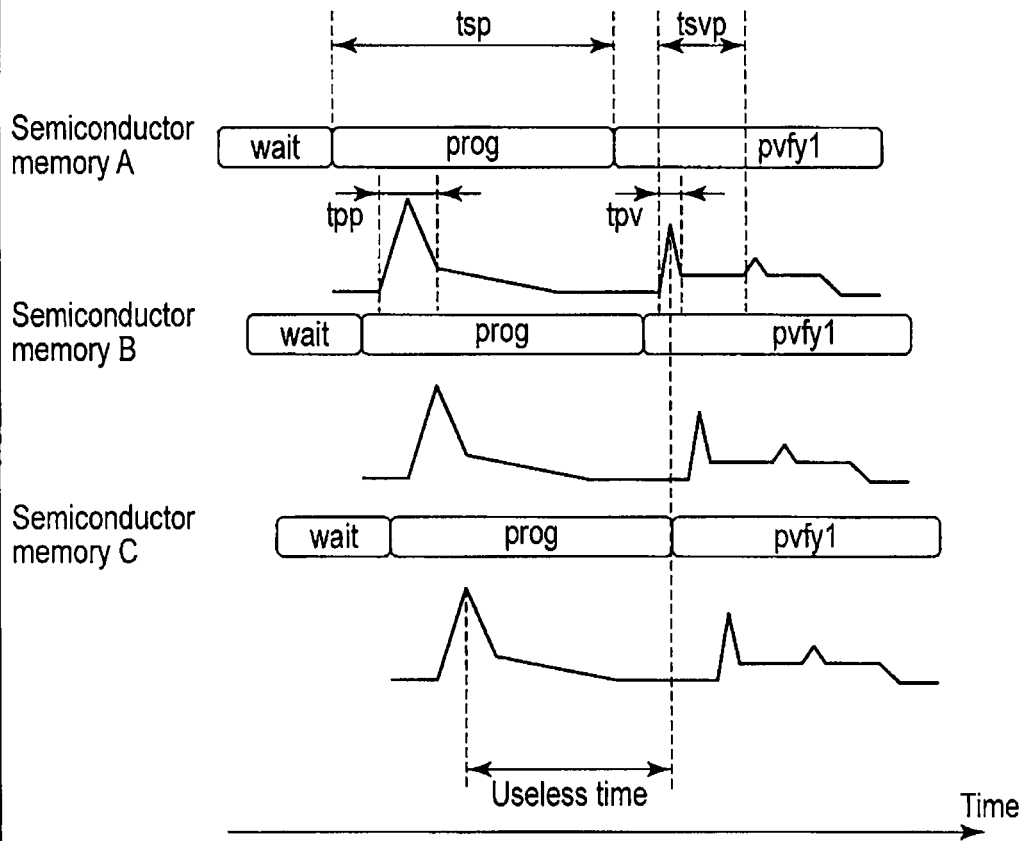
FIG. 15 illustrates a limitation to the number of chips which are operated in parallel.

As shown in FIG. 15, the operation period of program operation prog is tsp, and the peak period of current consumed in program operation prog is tpp. Accordingly, if only program operation prog is considered, when $Np<tsp/tpp<Np+1$ (where Np is a natural number), program can be executed in parallel in an Np number of semiconductor memories, at maximum.

Similarly, the pitch (peak pitch) of peak current of program verify operation pvfy1 is tsvp, and the peak period of current consumed in program verify operation pvfy1 is tpv. Accordingly, if only program verify operation pvfy1 is considered, when $Npv<tsvp/tpv<Npv+1$ (where Npv is a natural number), program can be executed in parallel in an Npv number of semiconductor memories, at maximum.

However, for example, in the internal sequence of the comparative example shown in FIG. 5, program operation prog and program verify operation pvfy1 are integrated and both are successively executed. In other words, no wait time "wait" is present between program operation prog and program verify operation pvfy1.

Thus, the number of semiconductor memories, which are caused to execute program operation prog and program verify operation pvfy1 in parallel, is set at the smaller one of Np and Npv.

Since Np>Npv, the number of semiconductor memories, which are operated in parallel, is determined by peak pitch tsvp and peak period tpv in program verify operation pvfy1.

In this case, however, as shown in FIG. 15, useless time occurs in operation period tsp of program operation prog.

In this example, if only program operation prog is taken into account, four or more semiconductor memories can be operated in parallel. However, since only three semiconductor memories A, B and C, at maximum, can be operated in parallel in program verify operation pvfy1, useless time occurs, as a result, in operation period tsp of program operation prog.

On the other hand, if the above-described embodiment (FIG. 6 to FIG. 14) is adopted, wait time "wait" is provided between program operation prog and program verify operation pvfy1, and status information can be notified to the controller within this wait time "wait". In other words, the end/restart of program operation prog and the end/restart of program verify operation pvfy1 can be controlled independently in the respective semiconductor memories.

Accordingly, the memory controller selects two or more semiconductor memories from among semiconductors, in association with each of operations which are executed in the internal sequences, and causes the two or more semiconductor memories to execute in parallel the same object operation (e.g. program verify operation) on condition that the peak periods of electric currents consumed in the two or more semiconductor memories do not overlap, thus being able to eliminate the useless time.

Next, an example of a semiconductor memory system including six semiconductor memories is described.

Figure 16:
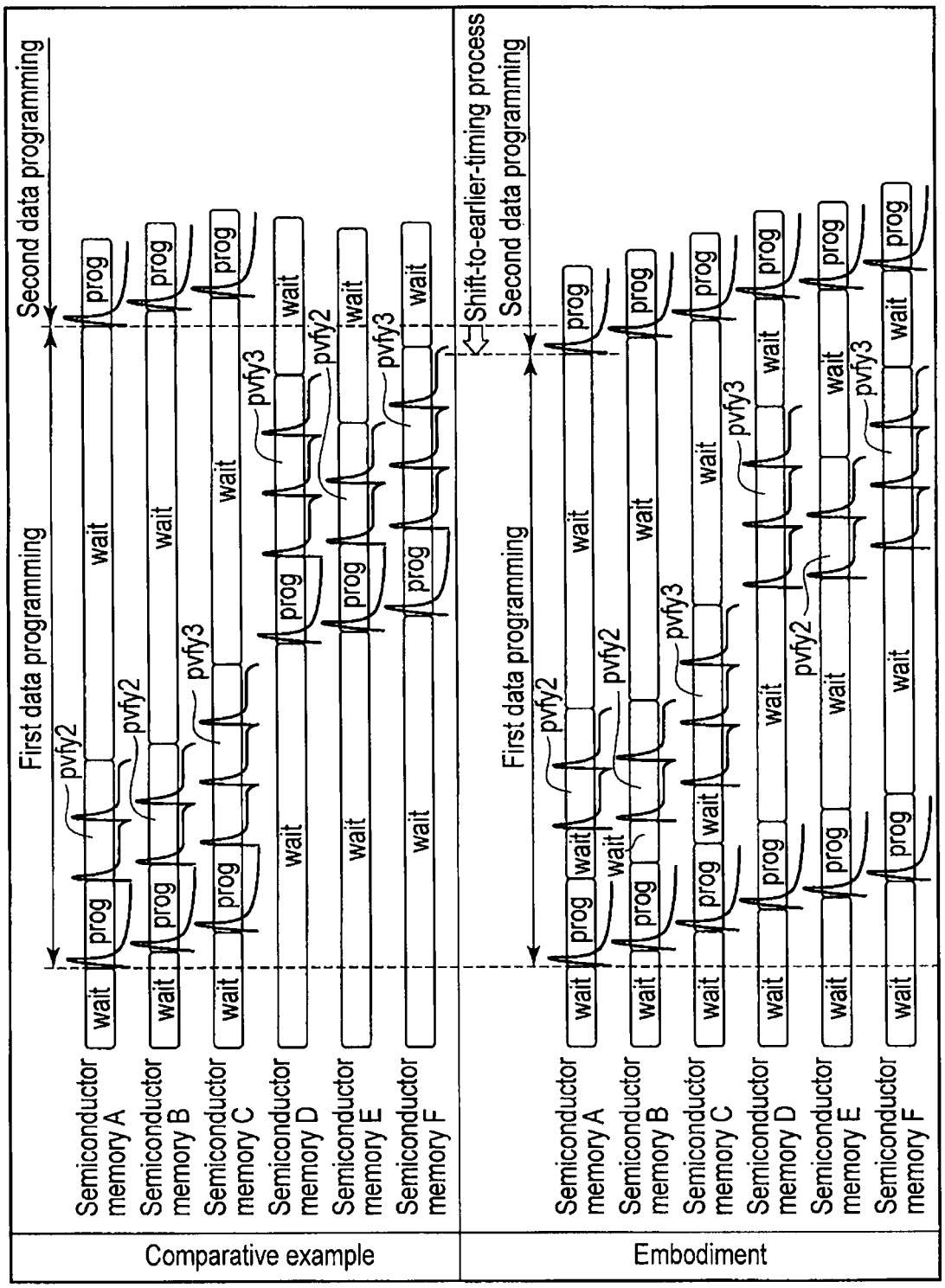
FIG. 16 and FIG. 17 illustrate an embodiment of internal sequences.

FIG. 16 illustrates an example in which two or more semiconductor memories, which are caused to execute identical object operations, are selected. FIG. 16 shows the embodiment and the comparative example, thereby clarifying the advantageous effect of the embodiment.

In this example, when the identical object operation is a program operation, six semiconductor memories are selected and these semiconductor memories are caused to operate in parallel. In addition, when the identical object operation is a program verify operation, three semiconductor memories are selected and these are operated in parallel.

It is assumed that the operation period of program operation prog is tsp, and the peak period of current consumed in program operation prog is tpp. In addition, it is assumed that $Np<tsp/tpp<Np+1$ (where Np=6), and six semiconductor memories, at maximum, can be operated in parallel.

Besides, it is assumed that the pitch (peak pitch) of peak current of program verify operation pvfy2, pvfy3 is tsvp, and the peak period of current consumed in program verify operation pvfy2, pvfy3 is tpv. In addition, it is assumed that $Npv<tsvp/tpv<Npv+1$ (where Npv=3), and three semiconductor memories, at maximum, can be operated in parallel.

In the internal sequence of the comparative example, program operation prog and program verify operation pvfy2, pvfy3 are successively executed, and no wait period "wait" is present therebetween. Thus, the number of semiconductor memories, which are caused to execute, in parallel, program operation prog and program verify operation pvfy2, pvfy3, is set at three.

In this example, if only program operation prog is taken into account, six semiconductor memories can be operated in parallel, but the result is that three semiconductor memories A, B and C are operated in parallel. After the end of first data programming (prog+pvfy2/prog+pvfy3), three semiconductor memories D, E and F are subsequently operated in parallel, and first data programming (prog+pvfy2/prog+pvfy3) is executed.

Consequently, useless time occurs in operation period tsp of program operation prog.

By contrast, in the internal sequence of the embodiment, wait period "wait" is provided between program operation prog and program verify operation pvfy2, pvfy3, and status information can be notified to the controller in wait period "wait". Specifically, the end/restart of program operation prog and the end/restart of program verify operation pvfy1 can be controlled independently in the respective semiconductor memories.

Accordingly, the number of semiconductor memories, which are caused to execute program operation prog in parallel, can be set at six at maximum, and the number of semiconductor memories, which are caused to execute program verify operation pvfy2, pvfy3 in parallel, can also be set at six at maximum.

In this example, to begin with, program operation prog is executed in parallel in six semiconductor memories A, B, C, D, E and F. After the end of program operation prog of first three semiconductor memories A, B and C, program verify operation pvfy2, pvfy3 is subsequently executed in parallel in these semiconductor memories A, B and C.

In the meantime, the timing of starting program verify operation pvfy2, pvfy3 of the first three semiconductor memories A, B and C may be set before the end of program operation prog of the other three semiconductor memories D, E and F, if the peak periods of currents consumed in six semiconductor memories A, B, C, D, E and F do not overlap.

If program operation prog of the other three semiconductor memories D, E and F is finished, these semiconductor memories D, E and F maintain wait period "wait" until the first three semiconductor memories A, B and C complete program verify operation pvfy2, pvfy3.

Then, after the end of program verify operation pvfy2, pvfy3 of the first three semiconductor memories A, B and C, program verify operation pvfy2, pvfy3 is subsequently executed in parallel in the other semiconductor memories D, E and F.

As has been described above, the memory controller selects two or more semiconductor memories from among six semiconductors A, B, C, D, E and F, in association with each of operations which are executed in the internal sequences, and causes the two or more semiconductor memories to execute in parallel identical object operations.

Thus, it is possible to prevent to occur useless time in operation period tsp of program operation prog, and the second data programming can be executed earlier. Accordingly, a still higher speed of the semiconductor memory system can be realized.

Figure 17:
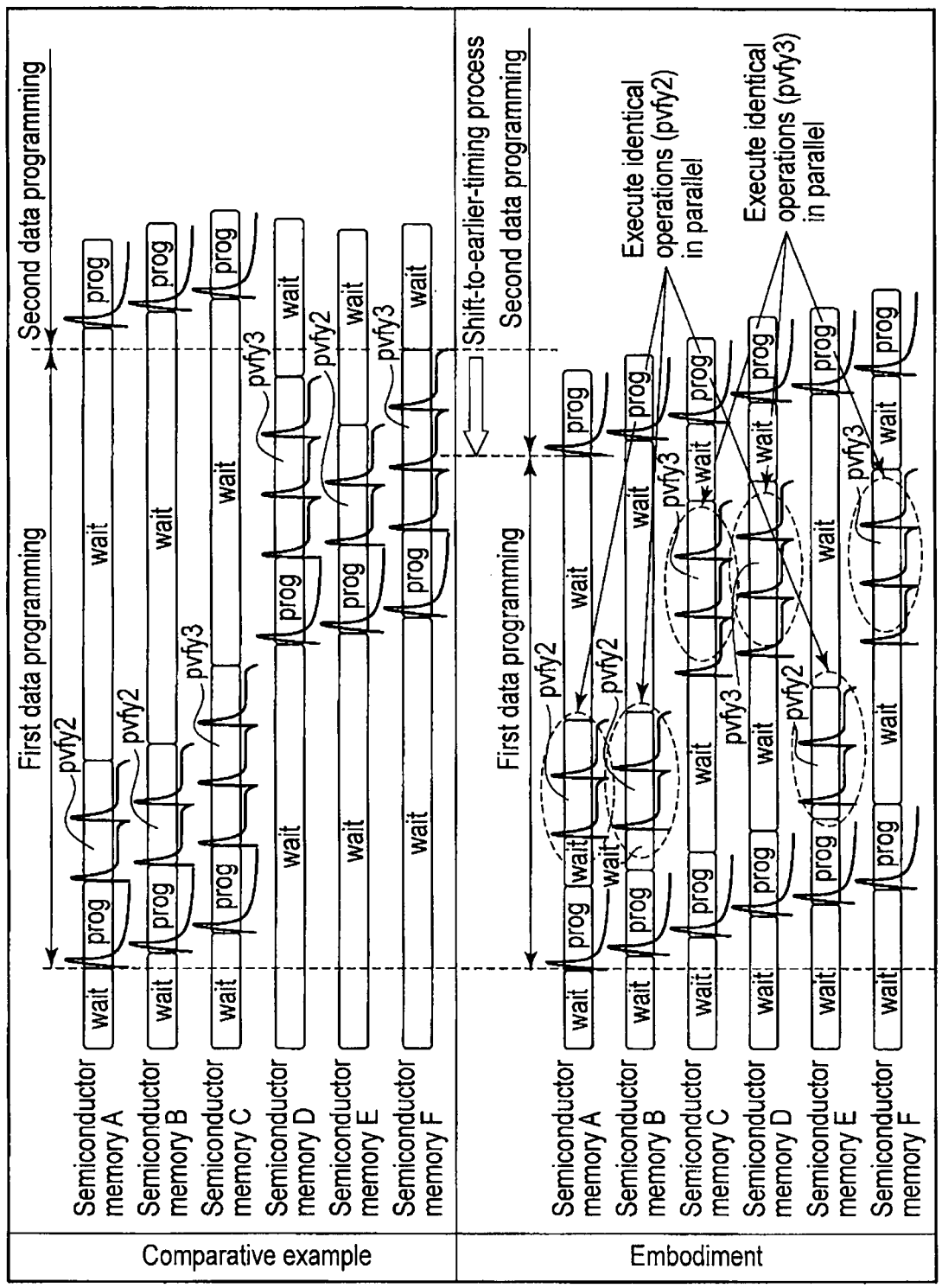

FIG. 17 illustrates another example in which two or more semiconductor memories, which are caused to execute the same object operation, are selected. FIG. 17 also shows the embodiment and the comparative example, thereby clarifying the advantageous effect of the embodiment.

In this example, when the same object operation is a program operation, six semiconductor memories are selected, and these semiconductor memories are operated in parallel. In addition, when the same object operation is a program verify operation which is executed subsequent to the program operation, three semiconductor memories are selected and these are operated in parallel.

The example of FIG. 17 differs from the example of FIG. 16 in that when the program verify operation is executed in parallel as the identical object operation, two or more semiconductor memories, which execute the identical verify operations, are selected from six semiconductor memories A, B, C, D, E and F, and the program verify operation of these two or more semiconductor memories are executed in parallel.

In this example, to begin with, program operation prog is executed in parallel in six semiconductor memories A, B, C, D, E and F. After the end of program operation prog of first two semiconductor memories A and B, program verify operation pvfy2 is subsequently executed in parallel in these semiconductor memories A and B.

Next, program operation prog of two semiconductor memories C and D ends. During the wait period of semiconductor memories C and D, the memory controller confirms that the next operation thereof is program verify operation pvfy3. However, since program verify operation pvfy3 is different from program verify operation pvfy2 of the first two semiconductor memories A and B, the wait state is continued.

Subsequently, program operation prog of semiconductor memory E ends. During the wait period of semiconductor memory E, the memory controller confirms that the next operation thereof is program verify operation pvfy2. Since program verify operation pvfy2 is identical to program verify operation pvfy2 of the first two semiconductor memories A and B, program verify operation pvfy2 is executed in parallel in semiconductor memories A, B and E.

Next, program operation prog of semiconductor memory F ends. During the wait period of semiconductor memory F, the memory controller confirms that the next operation thereof is program verify operation pvfy3. However, since program verify operation pvfy3 is different from program verify operation pvfy2 of the first two semiconductor memories A and B, the wait state is continued.

After the end of program verify operation pvfy2 of three semiconductor memories A, B and E, program verify operation pvfy3 is subsequently executed in parallel in the other semiconductor memories C, D and E.

As has been described above, the memory controller selects two or more semiconductor memories, which execute the identical verify operations, from among six semiconductors A, B, C, D, E and F, in association with each of operations which are executed in the internal sequences, and causes the two or more semiconductor memories to execute in parallel the program verify operation as the identical object operation.

Thus, it is possible to prevent to occur useless time in operation period tsp of program operation prog, and the second data programming can be executed at an earlier timing. Accordingly, a still higher speed of the semiconductor memory system can be realized.

As is clear from FIG. 16 and FIG. 17, the period, which corresponds to the shift-to-earlier-timing process, can be made longer in the method of executing the identical operation in parallel than in the method of executing different operations in parallel, the effect of eliminating useless time can more conspicuously be exhibited.

In the example of FIG. 17, one half of the six semiconductor memories executes identical operations and the other half executes identical operations. However, since this is not the usual case, and there are other cases, consideration needs to be given to such cases.

For example, in the example of FIG. 17, three of six semiconductor memories A, B, C, D, E and F execute program verify operation pvfy2, and the other three execute program verify operation pvfy3. However, in the case where semiconductor memories A and B, for instance, execute pvfy2, and semiconductor memories C, D, E and F execute pvfy3, these six semiconductor memories cannot be halved.

In this case, semiconductor memory A which first completes program operation prog, semiconductor memory B which executes the identical operation (pvfy2), and semiconductor memory C which executes the operation (pvfy3) closest to the operations thereof and completes program operation prog earliest, are operated in parallel. In addition, program verify operation pvfy3 is executed in parallel in the other three semiconductor memories D, E and F.

In addition, for example, in the case where semiconductor memories A and B execute pvfy2, semiconductor memories C and E execute pvfy4, semiconductor memory D executes pvfy3 and semiconductor memory F executes pvfy5, semiconductor memory A which first completes program operation prog, semiconductor memory B which executes the identical operation (pvfy2), and semiconductor memory D which executes the operation (pvfy3) closest to the operations thereof and completes program operation prog earliest, are operated in parallel. In addition, program verify operations pvfy4 and pvfy5 are executed in parallel in the other three semiconductor memories C, E and F.

Taken together, the main point of the embodiment is that the status (kind of program verify) of semiconductor memory A, which first completes program operation prog, is confirmed, and two semiconductor memories having a status identical or closest to the status of this semiconductor memory A are selected, and then parallel operations are executed in these three semiconductor memories.

In the present embodiment, the total number of semiconductor memories is six, but the number may be 4, 8, 10, 12, etc.

In the embodiment, when two semiconductor memories having the status identical or closest to the status of semiconductor memory A, which first completes program operation prog, are to be selected, this selection may be made by confirming the statuses of all semiconductor memories A, B, C, D, E and F after the completion of program operation prog in all semiconductor memories A, B, C, D, E and F.

In this case, compared to the example of FIG. 17, a delay occurs in the timing of starting the program verify operation (pvfy2) in semiconductor memory A which first completes program operation prog. However, from the overall viewpoint, there are cases in which the speed of the program operation can be more increased than in the example of FIG. 17.

Thus, when it is determined which method is to be adopted, a method which can most shorten the program time is comprehensively judged in consideration of values such as tpp, tpv, tsp, tsv1 to tsv5, and tsvp.

Figure 18:
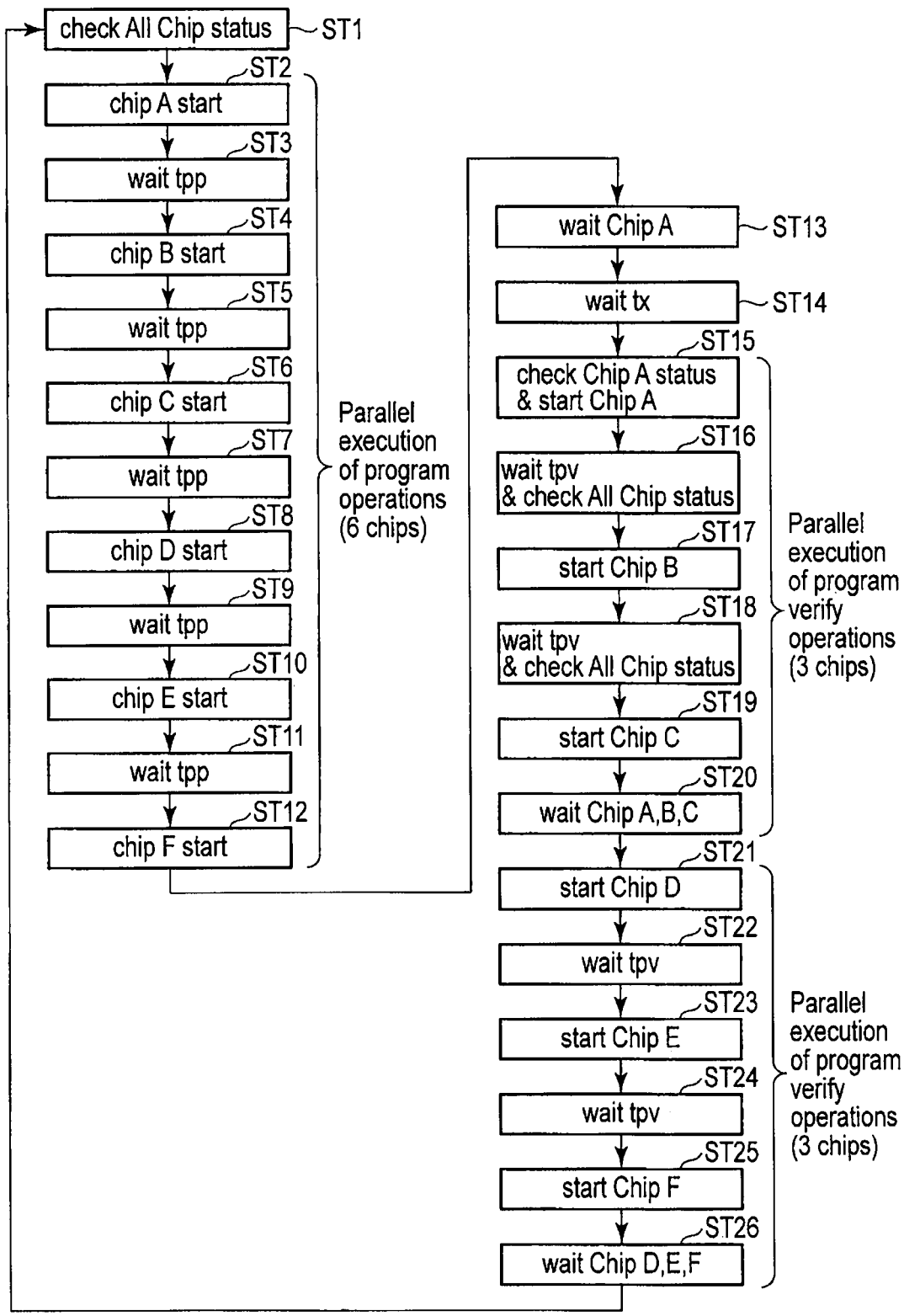
FIG. 18 and FIG. 19 are flow charts illustrating examples of a method of selecting chips which are operated in parallel.

FIG. 18 is a flow chart illustrating an example of a method of selecting semiconductor memories which execute program verify operations in parallel.

In this example, like the example of FIG. 17, each three of six semiconductor memories (chips) A, B, C, D, E an F are operated in parallel. Program operation prog of these semiconductor memories is executed in parallel, and the start timing thereof is shifted little by little. Accordingly, program operation prog is successively finished from semiconductor memory A toward semiconductor memory F.

The feature of this example is as follows. As regards first semiconductor memory A, a program verify operation is started at a timing after the end of the program operation. As regards the other five semiconductor memories B, C, D, E and F, after all program operations thereof are finished, the statuses of semiconductor memories B, C, D, E and F are confirmed, and two semiconductor memories, which are operated in parallel with semiconductor memory A, are selected.

To begin with, program operation prog is executed in parallel in six semiconductor memories A, B, C, D, E and F (steps ST1 to ST12).

As regards semiconductor memory A which first completes program operation prog, a program verify operation is executed at a predetermined timing after the end of program operation prog (steps ST13 to ST15).

Subsequently, after program operations prog of all semiconductor memories A, B, C, D, E and F are finished, the statuses of all semiconductor memories A, B, C, D, E and F are confirmed (step ST16). This confirmation should desirably be conducted during a wait period of peak current occurring in semiconductor memory A.

Then, one semiconductor memory having a status, which is identical or closest to the status of semiconductor memory A, is selected. If one or more semiconductor memories having the same status are present, that one of the semiconductor memories, which has completed the program operation earliest, is selected.

When there is no semiconductor memory having the status which is identical to the status of semiconductor memory A, that one of semiconductor memories having the closest status, which has completed the program operation earliest, is selected.

It is assumed that semiconductor memory B corresponds to this semiconductor memory. Thus, parallel operations are executed in these two semiconductor memories A and B (step ST17).

Thereafter, once again, the statuses of all semiconductor memories A, B, C, D, E and F are confirmed (step ST18). This confirmation should desirably be conducted during a wait period of peak current occurring in semiconductor memory B.

Then, one semiconductor memory having a status, which is identical or closest to the status of semiconductor memory A, is selected. If one or more semiconductor memories having the same status are present, that one of the semiconductor memories, which has completed the program operation earliest, is selected.

When there is no semiconductor memory having the status which is identical to the status of semiconductor memory A, that one of semiconductor memories having the closest status, which has completed the program operation earliest, is selected.

It is assumed that semiconductor memory C corresponds to this semiconductor memory. Thus, parallel operations are executed in these three semiconductor memories A, B and C (step ST19).

After the program verify operation is finished in three semiconductor memories A, B and C, parallel operations are executed in the other three semiconductor memories D, E and F (steps ST20 to ST26).

Figure 19:
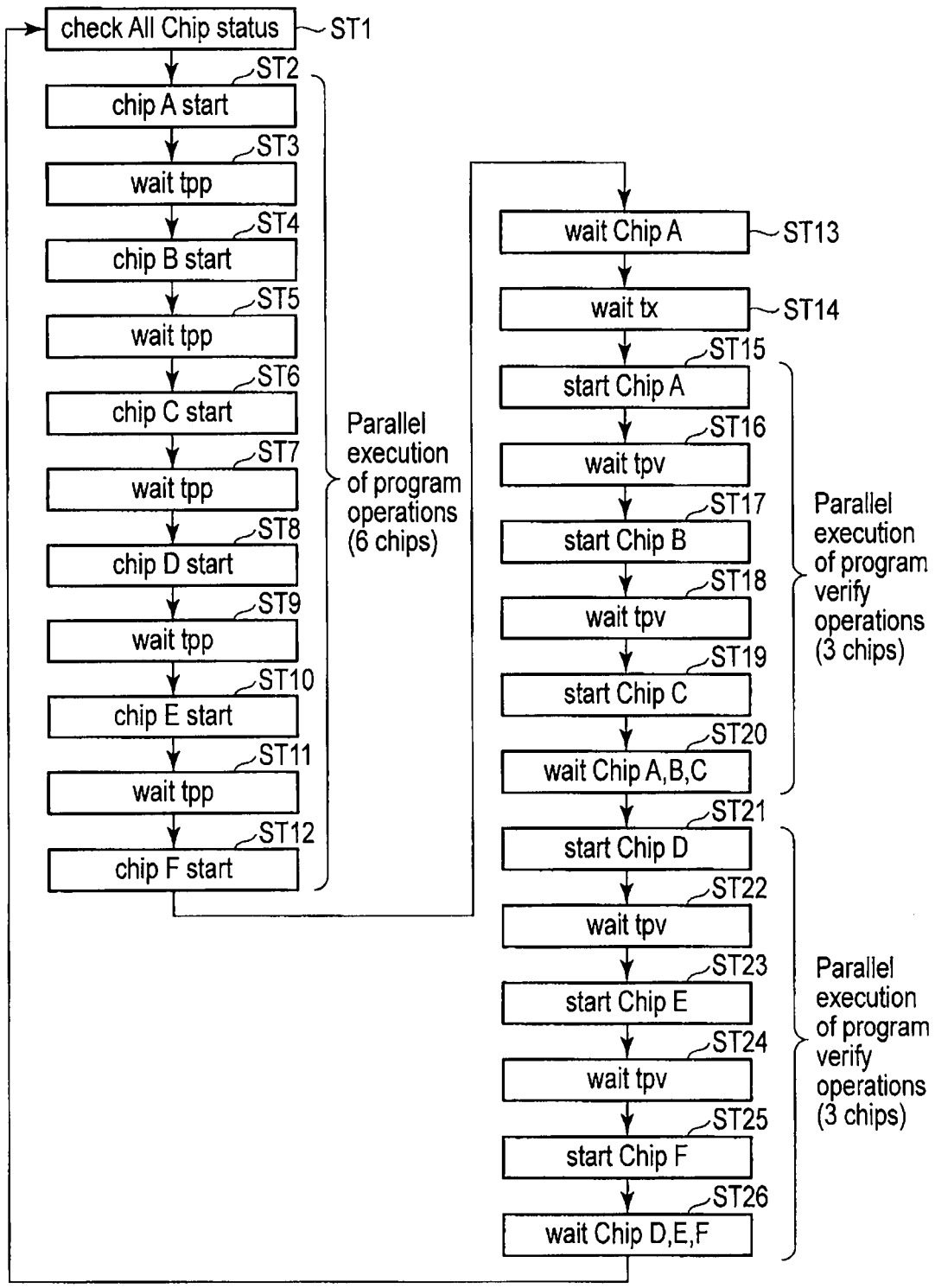

FIG. 19 is a flow chart of a comparative example, as compared to the example of FIG. 18.

In this comparative example, without confirming the status (kind of program verify) after program operation prog in all semiconductor memories (chips) A, B, C, D, E and F, three semiconductor memories A, B and C, which first complete program operation prog, are uniformly operated in parallel, and three semiconductor memories D, E and F, which subsequently complete program operation prog, are operated in parallel.

Program operation prog is the same as in the example of FIG. 18 (steps ST1 to ST14).

To start with, program verify operations of three semiconductor memories A, B and C are executed in parallel.

Specifically, after time tx has passed since semiconductor memory A completed program operation prog and transitioned to the wait state, the program verify operation of semiconductor memory A is started (step ST15).

Then, after peak period tpv has passed since the program verify operation of semiconductor memory A was started, the program verify operation of semiconductor memory B is started (steps ST16 and ST17).

After peak period tpv has passed since the program verify operation of semiconductor memory B was started, the program verify operation of semiconductor memory C is started (steps ST18 and ST19).

Then, after a predetermined period has passed since the program verify operation was finished in three semiconductor memories A, B and C, the program verify operation is subsequently executed in parallel in three semiconductor memories D, E and F (step ST20).

Specifically, the program verify operation of semiconductor memory D is started (step ST21).

Next, after peak period tpv has passed since the program verify operation of semiconductor memory D was started, the program verify operation of semiconductor memory E is started (steps ST22 and ST23).

Subsequently, after peak period tpv has passed since the program verify operation of semiconductor memory E was started, the program verify operation of semiconductor memory F is started (steps ST24 and ST25).

After the program verify operation is finished in three semiconductor memories D, E and F, the process returns to program operation prog.

In the comparative example, as regards the program verify operation, three semiconductor memories A, B and C are uniformly operated in parallel, regardless of the statuses of three semiconductor memories A, B and C. Consequently, for example, there is a case that the program verify operation of semiconductor memory B cannot be started when peak period tpv has passed since the program verify operation of semiconductor memory A was started.

For example, when tpp>tpv, as shown in part (a) of FIG. 20, there is a case, as shown in part (b) of FIG. 20, that program period tsp of semiconductor memory (chip) B has not terminated even after program verify period tpv of semiconductor memory (chip) A has passed. In this case, as a matter of course, semiconductor memory B cannot immediately start program verify after the passage of program verify period tpv of semiconductor memory A.

Thus, as shown in part (c) of FIG. 20, it is necessary to delay, by time tx, the timing of starting the program verify of semiconductor memory A, B, after program operation prog of semiconductor memory A is finished. As a result, in the comparative example, the operation delays by time tx, compared to the embodiment.

Some embodiments have been described above, but these embodiments are particularly effective, if applied to semiconductor memories with fine structures, or multileveled semiconductor memories. Even in the case of the identical object operation, when one of operations with different operation periods, such as a program verify operation, is selected, useless time tends to easily occur, and thus it is preferable to apply the embodiments to such cases.

The above-described embodiments should desirably be applied to nonvolatile semiconductor memories such as a NOR flash memory or a NAND flash memory, which are adopted in data storage products, such as an SSD, a memory card or a USB memory. However, also as regards semiconductor memories other than these, there is significance in applying the embodiment to semiconductor memories which are required to execute program in parallel.

According to the embodiments, an overlap of peak periods of consumption currents can be prevented when data program is executed in parallel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory system comprising:
  semiconductor memories; and
  a memory controller configured to control the semiconductor memories,
  wherein each of the semiconductor memories is configured to execute an internal sequence including operations and have a wait period after an end of each of the operations, to issue, during the wait period, a status signal that is issued during every wait period to indicate that a corresponding semiconductor memory is in the wait period and which notifies in advance a start of a next operation, to the memory controller, and to start the next operation upon receiving a restart instruction of the internal sequence from the memory controller, the next operation being one of a program operation, a verify operation, a read operation and an erase operation, and
  the memory controller is configured to issue, upon receiving the status signal from a first semiconductor memory of the semiconductor memories, the restart instruction to the first semiconductor memory, on condition that a peak period of current of the next operation of the first semiconductor memory does not overlap with a peak period of current of a second memory of the semiconductor memories excluding the first semiconductor memory.

2. The system of claim 1, wherein the memory controller is configured to cause the respective semiconductor memories to execute identical object operations in parallel, on condition that the peak periods of the semiconductor memories do not overlap, and
  the memory controller is configured to immediately issue, upon receiving the status signal indicative of an end of a first identical object operation of the identical object operations from the first semiconductor memory, the restart instruction to the first semiconductor memory, on condition that a difference between an operation period of the first identical object operation of the first semiconductor memory, and a longest operation period, among the identical object operations which are executed in parallel, is a first value or more.

3. The system of claim 1, wherein the memory controller is configured to select two or more semiconductor memories of the semiconductor memories, and to cause the two or more semiconductor memories to execute identical object operations, on condition that the peak periods of the two or more semiconductor memories do not overlap.

4. The system of claim 3, wherein a number of semiconductor memories operated in parallel among the two or more semiconductor memories is different between when the identical object operations are program operations and when the identical object operations are program verify operations.

5. The system of claim 4, wherein the program verify operations include program verify operations having mutually different peak periods, and the memory controller is configured to select, from the semiconductor memories, the two or more semiconductor memories which execute identical program verify operations.

6. The system of claim 1, wherein the status signal has 2 bits or more.

7. The system of claim 1, wherein the memory controller includes a management table relating to operation periods and the peak periods of the current consumed during the operation periods, with respect to the respective operations.

8. The system of claim 7, wherein the memory controller is configured to generate the restart instruction, based on the management table, when the memory controller has received the status signal.

9. The system of claim 1, wherein the semiconductor memories are configured to execute program of multi-value data in parallel.

10. A semiconductor memory device comprising:
  a memory cell array;
  a control circuit; and
  a status signal generation circuit,
  wherein the control circuit executes an internal sequence including operations, and the status signal generation circuit outputs a status signal that is issued every wait period to indicate that the semiconductor memory is in a wait period and which notifies in advance a start of a next operation during the wait period, the wait period being after an end of a first operation of the operations, the next operation being one of a program operation, a verify operation, a read operation and an erase operation.

11. The memory of claim 10, wherein the status signal has 2 bits or more.

12. The memory of claim 10, wherein verify operation includes verify operations of different operation periods.

13. The memory of claim 12, wherein a number of peak periods having one of verify operations are different from another verify operations.

14. The memory of claim 12, wherein a peak current of an initial peak period among the peak periods having the verify operations is maximum.

15. The memory of claim 10, wherein the read operation includes read operations of different operation periods.

* * * * *